(12) United States Patent
Jannard et al.

(10) Patent No.: US 10,499,024 B2
(45) Date of Patent: *Dec. 3, 2019

(54) VIDEO PROJECTOR SYSTEM

(71) Applicant: RED.COM, LLC, Irvine, CA (US)

(72) Inventors: James H. Jannard, Las Vegas, NV (US); Stuart J. English, Rancho Santa Margarita, CA (US); Gregory Alan Prior, San Jose, CA (US); Edmund Sandberg, Monte Sereno, CA (US); Ryan Newham, Irvine, CA (US)

(73) Assignee: RED.COM, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,572

(22) Filed: Nov. 20, 2017

(65) Prior Publication Data
US 2018/0184057 A1 Jun. 28, 2018

Related U.S. Application Data

(63) Continuation of application No. 15/068,383, filed on Mar. 11, 2016, now Pat. No. 9,854,214, which is a
(Continued)

(51) Int. Cl.
*F21V 8/00* (2006.01)
*G02B 6/06* (2006.01)
(Continued)

(52) U.S. Cl.
CPC ......... *H04N 9/3164* (2013.01); *G02B 6/0005* (2013.01); *G02B 6/06* (2013.01);
(Continued)

(58) Field of Classification Search
CPC .... H04N 9/315; H04N 9/3188; H04N 9/3161; H04N 9/3117; H04N 9/3129;
(Continued)

(56) References Cited

U.S. PATENT DOCUMENTS 3,783,185 A 1/1974 Spaulding
3,984,242 A 10/1976 Lamberts et al.
(Continued)

FOREIGN PATENT DOCUMENTS

CN 1383496 A 12/2002
CN 1625905 A 6/2005
(Continued)

OTHER PUBLICATIONS

International Search Report and Written Opinion for PCT Application No. PCT/US2013/036196, dated Jul. 11, 2013 in 12 pages.
(Continued)

*Primary Examiner* — Jefferey F Harold
*Assistant Examiner* — Mustafizur Rahman
(74) *Attorney, Agent, or Firm* — Knobbe, Martens, Olson & Bear, LLP

(57) ABSTRACT

Some embodiments provide for a modular video projector system having a light engine module and an optical engine module. The light engine module can provide narrow-band laser light to the optical engine module which modulates the laser light according to video signals received from a video processing engine. Some embodiments provide for an optical engine module having a sub-pixel generator configured to display video or images at a resolution of at least four times greater than a resolution of modulating elements within the optical engine module. Systems and methods for reducing speckle are presented in conjunction with the modular video projector system.

18 Claims, 22 Drawing Sheets

Related U.S. Application Data continuation of application No. 14/808,906, filed on Jul. 24, 2015, now Pat. No. 9,319,648, which is a continuation of application No. 14/526,163, filed on Oct. 28, 2014, now Pat. No. 9,106,843, which is a continuation of application No. 13/861,311, filed on Apr. 11, 2013, now Pat. No. 8,872,985.

(60) Provisional application No. 61/809,268, filed on Apr. 5, 2013, provisional application No. 61/780,958, filed on Mar. 13, 2013, provisional application No. 61/720,295, filed on Oct. 30, 2012, provisional application No. 61/624,167, filed on Apr. 13, 2012.

(51) Int. Cl.
| | |
|---|---|
| *H04N 9/31* | (2006.01) |
| *G02B 26/12* | (2006.01) |
| *G02B 27/26* | (2006.01) |
| *G02B 27/48* | (2006.01) |
| *G03B 21/00* | (2006.01) |
| *G03B 21/20* | (2006.01) |
| *G03B 33/00* | (2006.01) |
| *H04N 13/324* | (2018.01) |
| *H04N 13/363* | (2018.01) |

(52) U.S. Cl.
CPC ........... *G02B 26/123* (2013.01); *G02B 27/26* (2013.01); *G02B 27/48* (2013.01); *G03B 21/00* (2013.01); *G03B 21/005* (2013.01); *G03B 21/206* (2013.01); *G03B 33/00* (2013.01); *H04N 9/315* (2013.01); *H04N 9/3108* (2013.01); *H04N 9/3117* (2013.01); *H04N 9/3144* (2013.01); *H04N 9/3155* (2013.01); *H04N 9/3161* (2013.01); *H04N 9/3167* (2013.01); *H04N 9/3188* (2013.01); *H04N 13/324* (2018.05); *H04N 13/363* (2018.05)

(58) Field of Classification Search
CPC .. H04N 9/3185; H04N 1/387; H04N 1/40093; H04N 5/4401; H04N 13/021; H04N 13/0217; H04N 13/0214; H04N 13/0459
USPC ....... 348/756, 757, 758, 759, 760, 761, 779, 348/792, 725, 744, 674, 698, 203, 230.1, 348/310; 353/20, 30, 31, 34, 37, 57, 85, 353/84, 88, 89, 94, 98, 102, 121; 359/3, 359/15, 22, 40, 53, 437, 443, 649
See application file for complete search history.

(56) References Cited

U.S. PATENT DOCUMENTS

| | | | |
|---|---|---|---|
| 4,028,109 A | 6/1977 | Lamberts et al. | |
| RE29,670 E | 6/1978 | Spaulding | |
| 4,868,383 A | 9/1989 | Kurtz et al. | |
| 5,135,300 A | 8/1992 | Toide et al. | |
| 5,641,596 A | 6/1997 | Gray et al. | |
| 5,754,707 A | 5/1998 | Knowlton | |
| 5,875,167 A | 2/1999 | Katayama | |
| 5,940,050 A | 8/1999 | Joubert et al. | |
| 6,352,805 B1 | 3/2002 | Taylor et al. | |
| 6,395,459 B1 | 5/2002 | Taylor et al. | |
| 6,445,487 B1 | 9/2002 | Roddy et al. | |
| 6,511,183 B2 | 1/2003 | Shimizu et al. | |
| 6,511,184 B2 | 1/2003 | Yamagishi et al. | |
| 6,542,187 B1 | 4/2003 | Hamilton, Jr. et al. | |
| 6,577,429 B1 | 6/2003 | Kurtz et al. | |
| 6,583,912 B1* | 6/2003 | Van Lerberghe | G02B 7/1821 348/E5.137 |
| 6,584,283 B2 | 6/2003 | Gabello et al. | |
| 6,594,090 B2 | 7/2003 | Kruschwitz et al. | |
| 6,597,409 B1 | 7/2003 | Shioya et al. | |
| 6,600,590 B2 | 7/2003 | Roddy et al. | |
| 6,611,380 B2 | 8/2003 | Kowarz et al. | |
| 6,621,615 B2 | 9/2003 | Kruschwitz et al. | |
| 6,625,381 B2 | 9/2003 | Roddy et al. | |
| 6,631,992 B2 | 10/2003 | Brennesholtz | |
| 6,636,292 B2 | 10/2003 | Roddy et al. | |
| 6,690,697 B1 | 2/2004 | Kahen | |
| 6,712,472 B2* | 3/2004 | Florence | G03B 21/14 353/122 |
| 6,747,708 B2 | 6/2004 | Taniai et al. | |
| 6,790,696 B1 | 9/2004 | Kahen | |
| 6,791,739 B2 | 9/2004 | Ramanujan et al. | |
| 6,802,613 B2 | 10/2004 | Agostinelli et al. | |
| 6,807,010 B2 | 10/2004 | Kowarz | |
| 6,869,185 B2 | 3/2005 | Kaminsky et al. | |
| 6,879,306 B2 | 4/2005 | Spoonhower et al. | |
| 6,945,652 B2 | 9/2005 | Sakata et al. | |
| 6,947,459 B2* | 9/2005 | Kurtz | H01S 5/36 348/E9.027 |
| 6,950,454 B2 | 9/2005 | Kruschwitz et al. | |
| 6,970,606 B2 | 11/2005 | Lee et al. | |
| 6,996,146 B1 | 2/2006 | Kahen et al. | |
| 7,012,942 B2 | 3/2006 | Kahen et al. | |
| 7,027,666 B2 | 4/2006 | Rudak et al. | |
| 7,045,825 B2 | 5/2006 | Kahen et al. | |
| 7,046,446 B1 | 5/2006 | Kowarz et al. | |
| 7,065,115 B2 | 6/2006 | Kruschwitz et al. | |
| 7,065,243 B2 | 6/2006 | Boland et al. | |
| 7,119,936 B2 | 10/2006 | Kowarz et al. | |
| 7,122,843 B2 | 10/2006 | Kahen et al. | |
| 7,164,451 B2* | 1/2007 | Childers | G03B 21/2033 348/747 |
| 7,198,370 B2 | 4/2007 | Dubin et al. | |
| 7,206,455 B1 | 4/2007 | Hatipoglu | |
| 7,220,006 B2 | 5/2007 | Allen et al. | |
| 7,221,787 B2 | 5/2007 | Luo et al. | |
| 7,369,268 B2 | 5/2008 | Oehlbeck et al. | |
| 7,390,617 B2 | 6/2008 | Vargas et al. | |
| 7,575,330 B2 | 8/2009 | Allen et al. | |
| 7,697,053 B2 | 4/2010 | Kurtz et al. | |
| 7,714,923 B2 | 5/2010 | Cok et al. | |
| 7,782,347 B2 | 8/2010 | Oehlbeck et al. | |
| 7,808,540 B2 | 10/2010 | Cok | |
| 7,871,165 B2 | 1/2011 | Silverstein et al. | |
| 7,891,816 B2 | 2/2011 | Silverstein et al. | |
| 7,891,818 B2* | 2/2011 | Christensen | G03B 21/20 348/203 |
| 7,926,951 B2 | 4/2011 | Bietry et al. | |
| 7,959,297 B2 | 6/2011 | Silverstein et al. | |
| 8,016,422 B2 | 9/2011 | Silverstein et al. | |
| 8,018,504 B2 | 9/2011 | Kelly | |
| 8,033,666 B2 | 10/2011 | Silverstein et al. | |
| 8,066,382 B2* | 11/2011 | Silverstein | G03B 33/06 353/20 |
| 8,066,389 B2 | 11/2011 | Silverstein et al. | |
| 8,068,387 B2 | 11/2011 | Katsuragawa | |
| 8,094,355 B2* | 1/2012 | Gollier | G03B 21/28 353/81 |
| 8,157,388 B2 | 4/2012 | Bartlett et al. | |
| 8,212,198 B2 | 7/2012 | Facius et al. | |
| 8,272,750 B2 | 9/2012 | Murata | |
| 8,520,149 B2 | 8/2013 | Allen et al. | |
| 8,570,433 B1 | 10/2013 | Goldberg | |
| 8,872,985 B2 | 10/2014 | Jannard et al. | |
| 9,025,086 B2 | 5/2015 | Jannard et al. | |
| 9,106,843 B2 | 8/2015 | Jannard et al. | |
| 9,319,648 B2 | 4/2016 | Jannard et al. | |
| 9,854,214 B2 | 12/2017 | Jannard et al. | |
| 2002/0140904 A1 | 10/2002 | Brennesholtz | |
| 2002/0159036 A1 | 10/2002 | Yamagishi et al. | |
| 2002/0180932 A1 | 12/2002 | Shimizu et al. | |
| 2004/0264528 A1* | 12/2004 | Kruschwitz | H01S 5/36 372/39 |
| 2005/0052621 A1* | 3/2005 | Allen | H04N 9/3155 353/85 |
| 2005/0057557 A1 | 3/2005 | Kobayashi et al. | |

(56) References Cited

U.S. PATENT DOCUMENTS

| | | |
|---|---|---|
| 2005/0200812 A1 | 9/2005 | Sakata et al. |
| 2005/0231651 A1* | 10/2005 | Myers ............... H04N 9/3117 348/744 |
| 2006/0044512 A1* | 3/2006 | Dubin ............... G03B 21/006 353/20 |
| 2006/0163587 A1 | 7/2006 | Erchak et al. |
| 2006/0255243 A1* | 11/2006 | Kobayashi ......... G02B 26/101 250/208.1 |
| 2007/0216876 A1* | 9/2007 | Narikawa ........... H04N 9/3114 353/84 |
| 2007/0273839 A1* | 11/2007 | Doi .................. G03B 21/16 353/57 |
| 2007/0285627 A1* | 12/2007 | Allen ................ H04N 9/3155 353/85 |
| 2008/0025187 A1 | 1/2008 | Furuya |
| 2008/0095200 A1 | 4/2008 | Seyfried et al. |
| 2008/0129965 A1 | 6/2008 | Yonekubo |
| 2009/0109405 A1* | 4/2009 | Horikawa ........... G02B 27/46 353/31 |
| 2009/0284713 A1 | 11/2009 | Silverstein et al. |
| 2009/0302113 A1 | 12/2009 | Li et al. |
| 2009/0303397 A1 | 12/2009 | Allen et al. |
| 2010/0007855 A1 | 1/2010 | Murata |
| 2010/0110846 A1 | 5/2010 | Park et al. |
| 2010/0171932 A1* | 7/2010 | Facius ............... G02B 5/0215 353/31 |
| 2010/0172121 A1 | 7/2010 | Hikmet et al. |
| 2010/0225238 A1 | 9/2010 | Medin et al. |
| 2010/0245774 A1 | 9/2010 | Okuda et al. |
| 2010/0253769 A1* | 10/2010 | Coppeta ............ G02B 27/1026 248/346.01 |
| 2010/0302515 A1* | 12/2010 | Plut .................. H04N 9/3155 353/85 |
| 2010/0302776 A1 | 12/2010 | Hsu et al. |
| 2011/0134510 A1 | 6/2011 | Lippey et al. |
| 2012/0140320 A1 | 6/2012 | Arntsen et al. |
| 2012/0170110 A1 | 7/2012 | Lippey et al. |
| 2012/0219021 A1 | 8/2012 | Lippey et al. |
| 2012/0287117 A1 | 11/2012 | Weber et al. |
| 2012/0307349 A1 | 12/2012 | Arntsen et al. |
| 2013/0002157 A1 | 1/2013 | van de Ven et al. |
| 2013/0021586 A1 | 1/2013 | Lippey |
| 2013/0044367 A1* | 2/2013 | Lippey ............... G01N 21/65 359/327 |
| 2013/0235249 A1 | 9/2013 | Shimbo et al. |
| 2013/0300936 A1 | 11/2013 | Jannard et al. |
| 2013/0300948 A1 | 11/2013 | Jannard et al. |
| 2015/0042895 A1 | 2/2015 | Jannard et al. |

FOREIGN PATENT DOCUMENTS

| | | |
|---|---|---|
| CN | 104272728 | 1/2015 |
| EP | 1 193 531 A1 | 4/2002 |
| EP | 1 193 117 | 8/2003 |
| EP | 1 337 117 | 8/2003 |
| JP | H06-208170 A | 7/1994 |
| JP | H09-508476 A | 8/1997 |
| JP | 2003-066374 A | 3/2003 |
| JP | 2003-523531 A | 8/2003 |
| JP | 2004-503923 A | 2/2004 |
| JP | 2004-279943 A | 10/2004 |
| JP | 2005-283818 A | 10/2005 |
| JP | 2007-514323 A | 5/2007 |
| JP | 2008-209476 A | 9/2008 |
| JP | 2009-237077 A | 10/2009 |
| JP | 2010-145431 A | 7/2010 |
| JP | 2011-510333 A | 3/2011 |
| JP | 2011-141507 A | 7/2011 |
| JP | 2 842330 | 3/2015 |
| WO | WO 95/20811 | 8/1995 |
| WO | WO 01/62012 A1 | 8/2001 |
| WO | WO 02/05038 A2 | 1/2002 |
| WO | WO 2003/065737 | 8/2003 |
| WO | WO 2009/078941 A1 | 6/2009 |
| WO | WO 2013/155319 | 10/2013 |

OTHER PUBLICATIONS

Goodman, Joseph W., "Speckle Phenomena in Optics: Theory and Applications," 2007, pp. 141-144, 153, 170, 172, 175, 185, 187, 203, 206, 208, 209, 211-215, 225, 226, 237, 243, Roberts and Company Publishers, Greenwood Village, CO, USA, in 27 pages.

Japanese Office Action dated Mar. 10, 2017 for JP 2015-505914, filed Oct. 10, 2014 in 8 pages.

Summons to Attend Oral Proceedings issued in European Application No. 13718968.4, dated Dec. 7, 2016, in 6 pages.

Office Action issued in European Application No. 13718968.4, dated Mar. 15, 2016, in 6 pages.

Office Action issued in Chinese Application No. 201380019798.8, dated Feb. 28, 2017, in 9 pages.

Office Action issued in Chinese Application No. 201380019798.8, dated May 3, 2016, in 10 pages.

Japanese Office Action dated Mar. 10, 2017 for JP 2015-505914, in 8 pages.

* cited by examiner

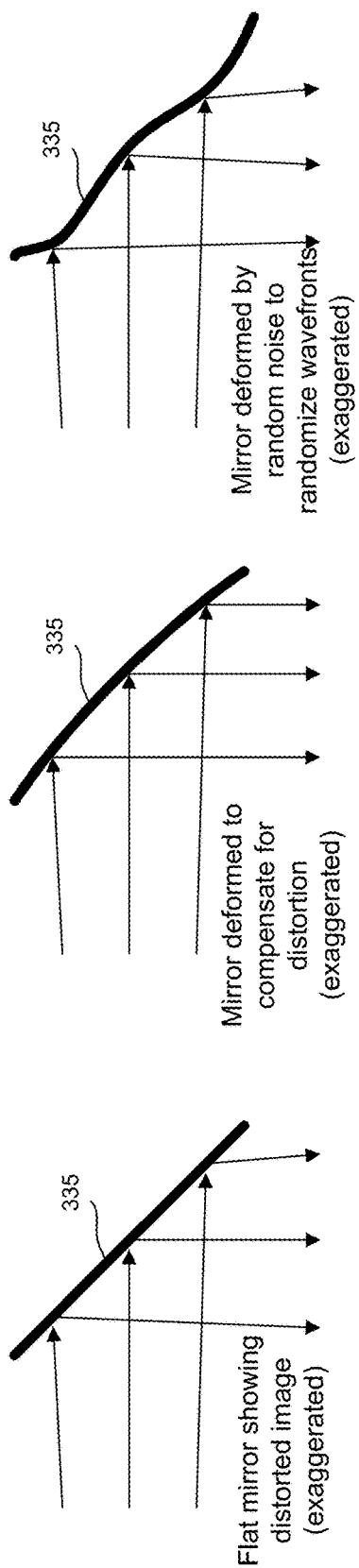

(SIDE VIEW)

(TOP VIEW)

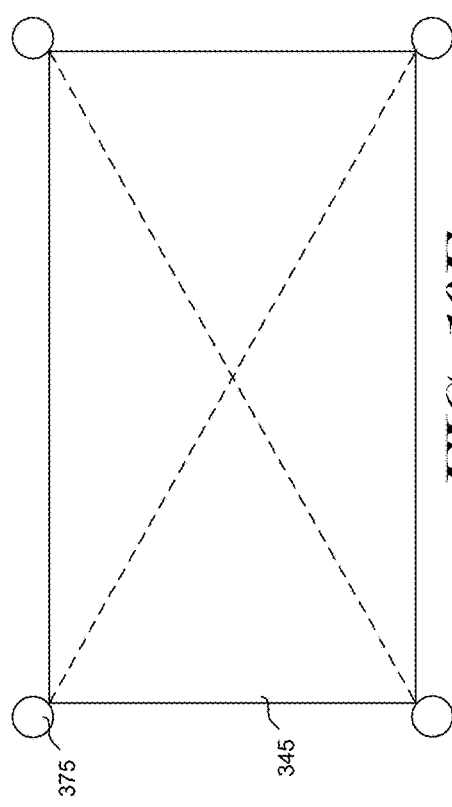
*FIG. 10E*
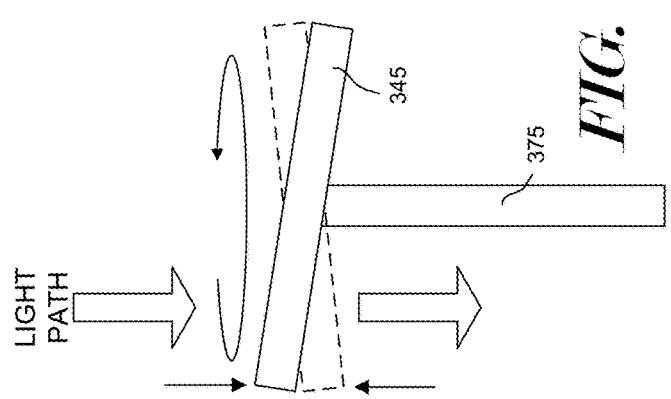
*FIG. 10D*
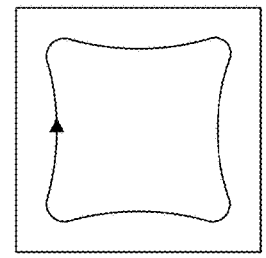
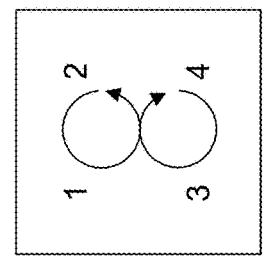
*FIG. 10F*
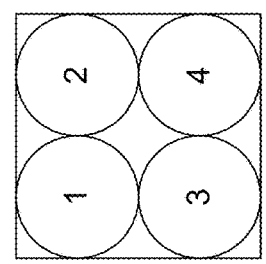

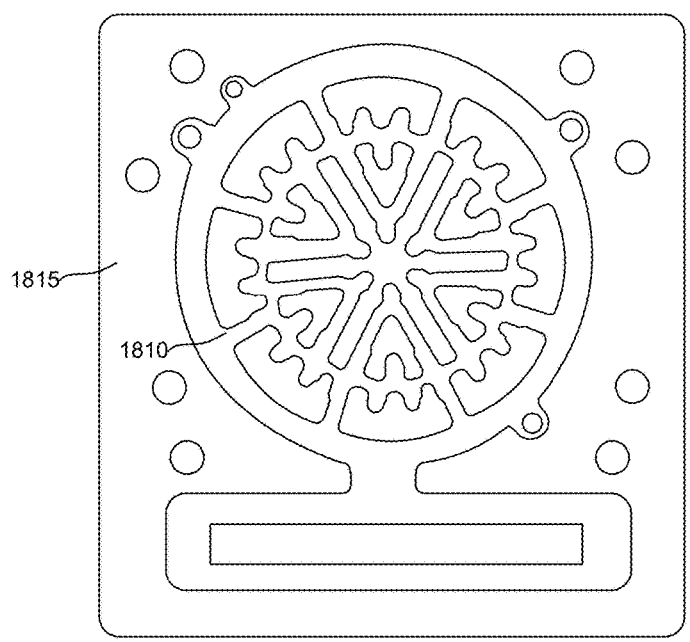
*FIG. 18A*
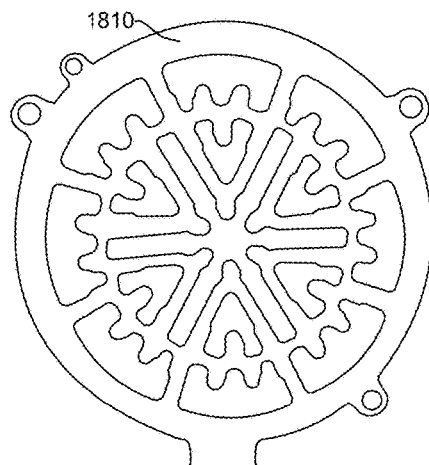  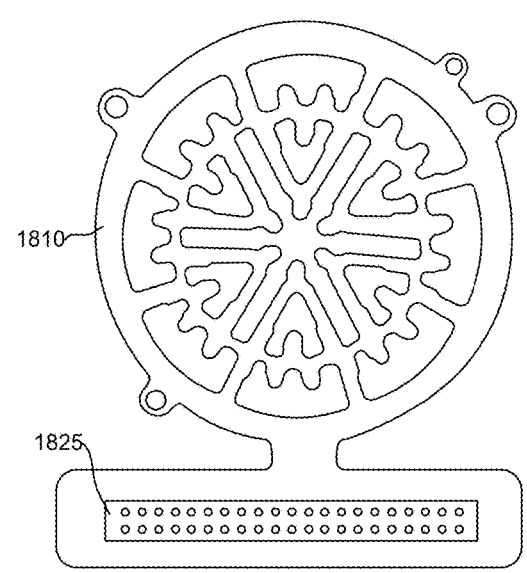
*FIG. 18B*     *FIG. 18C*

VIDEO PROJECTOR SYSTEM

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to projection systems, such as a modular laser video projection system.

Description of the Related Art

Projector systems are used to project video or images on a screen or other diffusive display surface. Projector systems can use lamps such as xenon or mercury lamps as a light source, light-emitting diodes ("LEDs") as a light source, or lasers as a light source. Some projection systems can modulate incoming light to produce an image or video. Modulation of the light can be accomplished using modulating panels such as liquid crystal display ("LCD") panels, digital micro-mirror devices ("DMDs"), or liquid crystal on silicon ("LCoS") panels. Projector systems can include optical, electrical, and mechanical components configured to improve the color, quality, brightness, contrast, and sharpness of the projected video or images.

SUMMARY

The systems, methods and devices of the disclosure each have innovative aspects, no single one of which is indispensable or solely responsible for the desirable attributes disclosed herein. Without limiting the scope of the claims, some of the advantageous features will now be summarized.

The video projector system described herein has a number of advantageous configurations to provide a range of capabilities. The video projector system includes a light engine configured to produce light having a variety of wavelengths that can be manipulated to produce relatively sharp and vivid video and images for projection onto a viewing screen. The video projector system includes a video processor configured to provide a video signal to be projected onto the viewing screen. The video projector system includes an optical engine configured to receive light from the light engine and to modulate it according to the video signal from the video processor.

Each of these systems can be combined into a single unit or any sub-combination can be joined into a single unit with the other being its own separate unit. For example, the laser light engine and the optical engine can be combined in a single housing to form one unit and a video processing system can be used to provide video signals to the light and optical engine through cables or wireless communication. This allows for a range of video inputs to be used without needing to change the video projector (e.g., the combined laser light engine and optical engine in this example). As another example, the video processor and optical engine can be combined into a single unit, and the laser light engine can be a modular system so that a configurable number of laser light engine modules can be used to adjust light output from the optical engine and video processing unit. As another example, all three systems can be combined in a single unit, providing a complete and self-contained video projector system. In some embodiments, additional systems and/or capabilities are provided through modules or additions to the laser light engine, the optical engine, and/or the video processor.

Some embodiments provide for a modular video projector system including one or more light engine modules, one or more video processing modules, and one or more optical engine modules. The modular aspect of the video projector system allows for dynamic configurations of light engines, video processors, and/or optical engines.

The light engine modules can include multiple laser diodes or other laser light sources configured to provide light to the optical engine module. The light engine modules can be configured to combine their light output for delivery to the optical engine module. In some embodiments, the light engine modules include cooling systems dedicated to maintaining a suitable temperature within each light engine module.

The video processing module can read video or image data from a storage medium, or alternatively receive video or image data from another source such as a computer, game console, or other digital video player (e.g., BluRay player, DVD player, or the like) or delivered over a network. The video processing module can send video data to the optical engine module to modulate the light received from the light engine module.

The optical engine module can be configured to receive light from the light engine module or another light source through fiber optic (e.g., multimode fiber optic) cables. The optical engine module can integrate the received light to produce a substantially rectangular area of light that has substantially uniform intensity and to scan the integrated light across a light modulating panel (e.g., LCoS panels, DMDs, LCDs, or other spatial light modulator). In some embodiments, the light from the light engine module is separated into color components. The optical engine module can utilize optical components to join the optical paths of the colors from the light engine module and scan the light across the modulating panel. The modulating panel modulates the light according to the video signals received from the video processing module, and the optical engine outputs and focuses the light on a screen. The optical engine module can include more than one modulating panel such that the light output can be increased, resolution can be enhanced, and/or stereoscopic video can be displayed.

Some embodiments provide for an optical engine module that is configured to enhance the resolution of the modulating panels included therein. The optical engine module can include a sub-pixel generator that includes, for example, a multi-lens array to reduce a size of each pixel from the modulating panels and then refract the reduced-size pixels to move them in varied configurations in rapid succession to produce a displayed video output with a higher resolution than a resolution of the modulating panels. In some embodiments, the modulating panel changes its orientation to move the pixel in a variety of configurations. By displaying the pixel at different positions in rapid succession, an enhanced resolution can be achieved. For example, by displaying 1920×1080 pixels in 4 different positions for each pixel at a rate of 240 Hz, an effective resolution of 3840×2160 or more pixels can be achieved with an effective frame rate of 60 Hz. In some embodiments, the optical engine module includes two modulating panels that produce pixel data that are offset from one another such that resolution along a direction is effectively doubled.

The video projector system can include multiple features configured to reduce the appearance of speckle, or varying light and dark spots caused at least in part by constructive and destructive interference of coherent light from coherent light sources. For example, the light engine can be configured to increase wavelength diversity through increasing spectral bandwidth of source lasers, providing multiple laser emitters with slightly different wavelengths, and/or injecting RF modulated signals into the emitters to broaden the emitted spectrum of light. Speckle can be reduced through other means including, for example, angle diversity through the fiber optic coupling of the light to the optical engine, physical orientation of laser sources, optical modulators, and one or more multi-lens arrays; phase angle diversity provided by the multiple internal reflections of the light through the multimode fiber and time-varying phase shift through an optical component; and polarization diversity through mechanical rotation of laser sources. In some embodiments, substantially all of the speckle reduction occurs within the projector. In some embodiments, one or more of these speckle reduction techniques is employed to reduce speckle at the display screen.

Some embodiments provide for a laser light engine that combines multiple lasers having approximately identical central wavelengths, with slight variations to introduce wavelength diversity, to form a virtual laser source that provides a single color output for delivery to the optical engine. This configuration can be repeated and modified for each color to produce desirable or suitable color output. These multiple lasers can be oriented and combined such that the resulting virtual laser source provides a relatively high level of light while reducing the presence of speckle in the resulting image. The multiple lasers can be configured to introduce angle diversity and polarization diversity through their relative physical orientation. The multiple lasers can be configured to experience a broadening of their emission spectrum due to injected RF-modulated signals. The multiple lasers can be selected to be incoherent with one another to reduce speckle.

Some embodiments provide for a modular video projector system including a light engine module comprising at least one light source, a video processing module, and an optical engine module. The light engine module, the video processing module, and the optical engine module comprise separate modules that are directly or indirectly connectable to one another through cables in at least one assembled configuration. In the at least one assembled configuration, the optical engine module is configured to receive video data provided by the video processing module, receive light provided by the light engine module, modulate the light provided by the light engine module based on the video data provided by the video processing module, and project the modulated light.

In some implementations, the light engine module provides laser light. In some implementations, the light source comprises a plurality of lasers.

In some implementations, the modular video projector system further includes a second light engine module directly or indirectly connectable to the assembled video projector system through cables. In a further aspect, the first and second light engine modules provide laser light.

In some implementations, the optical engine module is further configured to modulate light received from the light engine module based on the video data provided by the video processing module, reduce a size of received pixels, and move reduced size pixels within a bounded output pixel to at least 2 locations, wherein the reduced size pixels are moved to the at least 2 locations at a rate that is at least 2 times faster than a frame rate of the video data.

In some implementations, the light provided by the light engine module comprises at least three colors, and wherein the optical engine is configured to scan a separate band for each of the three colors across a surface of at least one modulating element. In a further aspect, a gap of substantially no light exists between the bands. In another further aspect, the optical engine includes spinning refractive elements which perform the scanning.

Some embodiments provide for a laser projector system that includes a light engine module comprising a plurality of lasers configured to provide a plurality of colors of light. The laser projector system includes a video output module configured to receive the plurality of colors of light over a fiber optic cable and to modulate the received light using at least two LCoS modulating panels to provide projected output video.

Some embodiments provide for a projector system that includes a video processing system configured to generate a modulation signal corresponding to an input video signal. The projector system includes a projector output module configured to receive the modulation signal and to modulate light from a plurality of light sources to generate an output display. The projector output module is configured to generate an output display with an effective resolution that is at least about 2 times greater than the input video signal.

Some embodiments provide for a projector system that includes a video processing system configured to generate a modulation signal corresponding to an input video signal having a native resolution. The projector system includes a projector output module configured to receive the modulation signal and to generate an output video that has an output resolution that is at least about 2 times greater than the native resolution.

In some implementations, the input video has a frame rate of about 30 Hz and a frame rate of the output video is at least about 60 Hz. In some implementations, the native resolution is at least about 1080 vertical lines and the output resolution is at least about 4320 vertical lines.

Some embodiments provide for a projector system that includes an integrator that receives and spreads out light in a substantially rectangular band. The projector system includes at least one modulating element comprising an array of pixels and configured to modulate light, generating an array of modulated pixels. The projector system includes a sub-pixel generator comprising a plurality of optical elements and a movable refractive element. The plurality of optical elements is configured to receive the array of modulated pixels and to reduce a size of each of the modulated pixels in the array. The refractive element is configured to move the reduced size pixels. The combination of the sub-pixel generator and the modulating element produces projected output video.

In some implementations, the resolution of the projected output video is at least about 2 times greater than the resolution of the modulating element. In some implementations, the resolution of the projected output video is at least about 4 times greater than the resolution of the modulating element.

Some embodiments provide for a projector system that includes an integrator that receives and spreads out light in a substantially rectangular band, having a width along a first direction and a height shorter than the width in a second direction. The projector system includes a scanning system configured to scan light from integrator along the second direction relative to the rectangular band. The projector system includes a polarizing system configured to receive light from the scanning system and to polarize the received light. The projector system includes at least two modulating elements configured to receive the polarized light and to modulate the polarized light, wherein a first modulating element modulates light having a first polarization and a second modulating element modulates light having a second, orthogonal polarization. The projector system includes an optical system configured to combine the modulated light from the first modulating element and the modulated light from the second modulating element to provide stereoscopic video output.

Some embodiments provide for a method for increasing a resolution of a projector system using a sub-pixel generator. The method includes receiving modulated light, light modulated according to source video. The method includes directing the modulated light onto a lens array wherein each modulated pixel is directed onto a lens of the lens array. The method includes reducing a size of received pixels using the lens. The method includes moving reduced size pixels within a bounded output pixel to at least 2 locations in rapid succession using a refractive element. The reduced size pixels are moved to the at least 2 locations at a rate that is at least 2 times faster than a frame rate of the source video.

Some embodiments provide for a video projector system that includes a light source, a video processing engine configured to provide digital video data having a first resolution and a first frame rate, and an optical path. The optical path is configured to receive the digital video data from the video processing system, to receive light generated by the light source, and to modulate the received light using a modulating element wherein the modulated light includes a plurality of pixels. The optical path is further configured, for individual ones of the modulated pixels, to generate a modulated sub-pixel by reducing a size of the modulated pixel and to move the sub-pixel to at least two different locations. The optical path is further configured to project the modulated sub-pixels as output video at each of the at least two locations.

In some implementations, the sub-pixel is moved within an area defined by a size of the modulated pixel. In some implementations, the sub-pixel is moved according to a pre-determined geometric pattern. In some implementations, the at least two locations comprises at least four different locations.

In some implementations, the light source provides laser light. In some implementations, the light source provides light generated by a plurality of light emitting diodes.

In some implementations, the optical path includes at least one modulating element configured to modulate the light received from the light engine module. In a further aspect, the at least one modulating element comprises a liquid crystal on silicon (LCoS) panel. In another further aspect, the optical path includes at least two modulating elements. In yet a further aspect, projected light from a first of the modulating elements is spatially offset from projected light from a second of the modulating elements by a fraction of a pixel.

In some implementations, the optical path includes a microlens array configured to receive the modulated pixels and generate modulated sub-pixels. In some implementations, the optical path includes a movable refractive element configured to receive the modulated sub-pixels and move the modulated sub-pixels.

In some implementations, the effective horizontal resolution of the output video is at least about 3840 horizontal pixels. In some implementations, the effective horizontal resolution of the output video is at least about 4000 horizontal pixels.

In some implementations, the projected modulated sub-pixels produce projected output video having an effective resolution that is at least about 2 times greater than a native resolution of a modulating element that is configured to modulate the light received from the light engine module. In a further aspect, the effective resolution is at least about 4 times greater than a native resolution of the modulating element.

Some embodiments provide for a video projector system that includes a light source, a video processing engine configured to provide digital video data having, and an optical path configured to receive the digital video data from the video processing system and to receive light generated by the light source. The optical path includes at least two modulating elements configured to modulate the received light based on the received digital video data, the modulated light comprising a plurality of pixels. The optical path also includes optics configured to refract the light modulated by the at least two modulating elements and to output the modulated light for projection onto a display surface. The optical path further is configured such that projected light modulated by a first modulating element of the at least two modulating elements is spatially offset with respect to projected light modulated by a second modulating element of the at least two modulating elements.

In some implementations, the projected light has an effective resolution at least twice as high as a native resolution of the individual modulating elements.

Some embodiments provide for a video projector that includes a light source providing at least two colors of light, a video processing engine configured to provide digital video data having a source resolution and a source frame rate, and an optical path configured to receive the digital video data from the video processing engine and to receive light generated by the light source. The optical path includes a modulating element configured to modulate light incident thereon. The optical path includes a scanning system configured to scan light from the different colors across the modulating element in a manner in which each color is incident on a different portion of the modulating element than any of the other colors at a particular point in time.

In some implementations, the light source provides at least three colors of light. In a further aspect, the scanning system includes a set of scanning elements comprising a separate scanning element for each of the three colors of light, each scanning element configured to move to direct light of the respective color across the modulating element. The scanning elements are arranged at an angular offset with respect to one another, the angular offset causing light emanating from each scanning element to strike a different portion of the modulating element at a particular point in time than does light emanating from the other scanning elements. In a further aspect, each of the scanning elements comprises a spinning element, wherein rotation of the spinning element causes light emanating from the spinning element to scan across the modulating element. In a further aspect, the spinning elements comprise hexagonal refractive elements. In some implementations, at the particular point in time, the scanning system illuminates a first band of the modulating element with light of a first color, a second band of the modulating element with light of the second color, and a third band of the modulating element with light of the third color. In a further aspect, at the particular point in time, the scanning system does not illuminate portions of the modulating element between the illuminated bands.

In some implementations, the scanning system is configured to provide a gap of substantially no light between illuminated areas on the modulating element.

In some implementations, the light source comprises a plurality of lasers. In some implementations, the light source comprises a plurality of light emitting diodes.

Some embodiments provide for a video projector that includes an optical path configured to receive digital video data from a video processing engine that is configured to provide digital video data, and to receive light generated by a light source, the light source providing at least two colors of light. The optical path includes a modulating element configured to modulate light incident thereon, and a scanning system configured to scan light from the at least two different colors across the modulating element in a manner in which each color is incident on a different portion of the modulating element than any of the other colors at a particular point in time.

In some implementations, the light source provides at least three colors of light. In a further aspect, the scanning system includes a set of scanning elements comprising a separate scanning element for each of the three colors of light, each scanning element configured to move to direct light of the respective color across the modulating element. The scanning elements are arranged at an angular offset with respect to one another, the angular offset causing light emanating from each scanning element to strike a different portion of the modulating panel at the particular point in time than does light emanating from the other scanning elements. In a further aspect, each of the scanning elements comprises a spinning element, wherein rotation of the spinning element causes light emanating from the spinning element to scan across the modulating element. In a further aspect, the spinning elements comprise hexagonal refractive elements. In a further aspect, at the particular point in time the scanning system illuminates a first band of the modulating element with light of a first color, a second band of the modulating element with light of the second color, and a third band of the modulating element with light of the third color. In a further aspect, at the particular point in time the scanning system does not illuminate portions of the modulating element between the illuminated bands. In some implementations, the scanning system is configured to provide a gap of substantially no light between illuminated areas on the modulating element.

In some implementations, the light source comprises a plurality of lasers. In some implementations, the light source comprises a plurality of light emitting diodes.

In some implementations, the video projector includes the light source. In some implementations, the video projector includes the video processing engine.

Some embodiments provide for a method of modulating light in a video projector system. The method includes receiving at least two colors of light from a light source. The method includes receiving digital video data from a video processing engine, the digital video data having a source resolution and a source frame rate. The method includes directing the received light from the light source along an optical path to a modulating element. The method includes modulating light incident on the modulating element according to the received digital video data. The method includes scanning light from the at least two colors across the modulating element in a manner in which, at a particular time, each color is incident on a different portion of the modulating element.

In some implementations, at the particular time there is a gap of substantially no light between each color incident on the modulating element.

In some implementations, scanning light includes refracting light using a spinning refractive element. In a further aspect, the spinning refractive element comprises a hexagonal refractive element.

In some implementations, the method further includes directing light of a first polarization from each of the colors along the optical path and directing light of a second, orthogonal polarization from each of the colors along a second optical path. In a further aspect, the method further includes using a second modulating element to modulate light directed along the second optical path, wherein the light having the second, orthogonal polarization is incident on the second modulating element. In a further aspect, the method includes scanning light from the second optical path across the second modulating element in a manner in which, at the particular time, each color is incident on a different portion of the second modulating element. In a further aspect, the method includes combining the modulated light from the optical path with the modulated light from the second optical path, and projecting the combined modulated light onto a display screen. In a further aspect, the combined modulated light forms a stereoscopic image on the display screen.

Some embodiments provide for a modular video projector system that includes a light engine module comprising at least one light source, and an optical engine module housed in a separate packaging than the light engine module. The optical engine module is configured to receive video data provided by a video processing module, to receive light provided by the light engine module, to modulate the light provided by the light engine module based on the video data provided by the video processing module, and to project the modulated light.

In some implementations, the light engine module provides laser light. In a further aspect, the optical engine module and the light engine module are connected together via at least one optical cable.

In some implementations, the modular projector system further includes at least a second light engine module connected to the optical engine module. In some implementations, the optical engine module is configured to operate with up to at least 3 light engine modules at the same time. In some implementations, the optical engine module is configured to operate with up to at least 4 separate light engine modules at the same time. In some implementations, the optical engine module is configured to operate with up to at least 5 separate light engine modules at the same time. In some implementations, the optical engine module is configured to optionally operate with between one and five separate light engine modules at the same time.

In some implementations, the optical engine module is further configured to receive light provided by the second light engine module, to modulate the light provided by the light engine module based on the video data provided by the video processing module, and to project the modulated light. In a further aspect, the first and second light engine modules provide laser light. In a further aspect, the first and second light engine modules are connected to the optical engine module via at least one optical cable. In some implementations, the light source comprises a plurality of lasers.

In some implementations, the optical engine module is further configured to modulate light received from the light engine module based on the video data provided by the video processing module, to reduce a size of received pixels, and to move reduced size pixels within a bounded output pixel to at least 2 locations, wherein the reduced size pixels are moved to the at least 2 locations at a rate that is at least 2 times faster than the frame rate of the source video. In a further aspect, the reduced size pixels are moved to at least 4 locations at a rate that is at least 4 times faster than the frame rate of the source video.

In some implementations, the light provided by the light engine module comprises at least three colors and the optical engine is configured to scan a separate band for each of the three colors across a surface of at least one modulating element. In a further aspect, a gap of substantially no light exists between the bands. In a further aspect, the optical engine includes spinning refractive elements which perform the scanning.

In some implementations, the modular video projector system further includes a video processing module containing the video processing electronics and having a separate packaging than at least the optical engine module. In a further aspect, the video processing module has a separate packaging than both of the optical engine module and the light engine module.

Some embodiments provide for a laser projector system that includes a light engine module comprising a plurality of lasers configured to provide a plurality of colors of light, and a video output module configured to receive the plurality of colors of light over a fiber optic cable and to modulate the received light using at least one light modulating panel to provide projected output video. For instance, the at least one light modulating panel can be an LCoS modulating panel.

In some implementations, the video output module modulates the received light using at least two light modulating panels (e.g., LCoS modulating panels) to provide the projected output video.

Some embodiments provide for a projector system that includes a video processing system configured to generate a modulation signal corresponding to an input video signal. The projector system includes a projector output module configured to receive the modulation signal and to generate an output video using at least one light modulating element having a native pixel resolution. The output video has an output resolution that is at least about 2 times greater than the native pixel resolution of the light modulating element.

In some implementations, the effective output resolution is at least about 2 times greater than the native pixel resolution. In some implementations, the input video signal has a frame rate of about 30 Hz and a frame rate of the output video is at least about 60 Hz. In some implementations, the native pixel resolution is at least about 1080 vertical lines and the effective output resolution is at least about 4320 vertical lines.

Some embodiments provide for a video projector system that includes an optical path configured to receive digital video data from a video processing engine and to receive light from a light source. The optical path is configured to modulate the received light according to the received digital video data using a modulating element, the modulated light comprising a plurality of pixels. For each of the modulated pixels, the optical path is configured to generate a modulated sub-pixel by reducing a size of the modulated pixel and to move the sub-pixel in a geometric pattern within an area defined by a size of the modulated pixel.

In some implementations, the pattern is repeated with a sub-pixel frequency. In a further aspect, the sub-pixel frequency is greater than a frame rate of the digital video data.

In some implementations, the optical path comprises a plurality of optical elements, the plurality of optical elements configured to reduce the size of the modulated pixel. In a further aspect, the plurality of optical elements comprises a microlens array.

In some implementations, the optical path comprises a refractive element, the refractive element configured to move the sub-pixel in the geometric pattern.

In some implementations, the light source provides laser light. In some implementations, the light source provides light generated by a plurality of light emitting diodes.

In some implementations, the modulating element comprises an LCoS panel. In some implementations, the optical path comprises at least two modulating panels. In a further aspect, projected light from a first of the modulating panels has a different polarization from projected light from a second of the modulating panels.

In some implementations, the horizontal resolution of the received digital video data is at least about 3840 horizontal pixels.

In some implementations, wherein the projected modulated sub-pixels produce projected output video having an effective resolution that is at least about 2 times greater than a native resolution of a modulating element that is configured to modulate the light received from the light engine module. In a further aspect, the effective resolution is at least about 4 times greater than a native resolution of the modulating element.

Some embodiments provide for a video projector system that includes an optical path configured to receive digital video data from a video processing engine and to receive light from a light source. The optical path includes a modulating element configured to modulate the received light incident thereon according to the received digital video data, the modulating element comprising a plurality of pixels configured to provide a plurality of modulated pixels. The optical path includes a sub-pixel generator comprising an optical element configured to move each of the plurality of modulated pixels in a geometric pattern.

In some implementations, the optical element of the sub-pixel generator comprises a movable refractive element. In some implementations, the sub-pixel generator further comprises a plurality of lenses configured to reduce a size of each of the plurality of modulated pixels. In a further aspect, a size of the geometric pattern is defined by a size of a modulated pixel. In some implementations, the sub-pixel generator further comprises mechanical elements configured to move the optical element.

In some implementations, the video projector system further includes the light source. In a further aspect, the light source provides light from a plurality of lasers. In a further aspect, the light source provides light from a plurality of LEDs.

In some implementations, the video projector system further includes a scanning system configured to scan light from the light source across the modulating element. In some implementations, the video projector system further includes a projector lens configured to project the modulated pixels as output video.

Some embodiments provide for a method for displaying a video stream using a video projector system. The method includes receiving digital video data from a video processing engine. The method includes receiving light from a light source. The method includes modulating the received light according to the received digital video data using a modulating element, the modulated light comprising a plurality of pixels. For each of the modulated pixels, the method includes generating a modulated sub-pixel by reducing a size of the modulated pixel and moving the sub-pixel in a geometric pattern within an area defined by a size of the modulated pixel.

In some implementations, reducing a size of the modulated pixel comprises using a microlens array to generate an image of the modulated pixels wherein a ratio of a size of a modulated pixel to a size of a modulated sub-pixel is at least about 2. In some implementations, the method further includes projecting the modulated sub-pixels as output video.

In some implementations, moving the sub-pixel comprises moving a refractive element such that the modulated sub-pixel moves in the geometric pattern. In a further aspect, moving the refractive element comprises using mechanical elements to adjust an orientation of the refractive element.

In some implementations, the geometric pattern is repeated with a pattern frequency. In a further aspect, the pattern frequency is greater than a frame rate of the digital video data.

Some embodiments provide for a video projector that includes a modulating element configured to modulate light incident thereon in response to signals derived from digital video data, the light generated by a light source and corresponding to at least first light of a first color and second light of a second color. The video projector includes a scanner positioned before the modulating element in the optical path. The scanner includes a first optical element configured to direct a first band of the first light passing therethrough across at least a portion of the modulating element. The scanner includes a second optical element configured to direct a second band of the second light passing therethrough across the portion of the modulating element, wherein the first and second bands remain substantially separate as they move across the portion of the modulating element.

In some implementations, the first optical element and the second optical element move to cause the first and second bands of light to be directed across the portion of the modulating element. In a further aspect, the first optical element has a geometric profile that is substantially similar to that of the second optical element. In a further aspect, the first optical element and the second optical element are rotationally offset with respect to one another and rotate simultaneously to cause the first and second bands of light to be directed across the portion of the modulating element.

BRIEF DESCRIPTION OF THE DRAWINGS

The drawings are provided to illustrate example embodiments described herein and are not intended to limit the scope of the disclosure. Throughout the drawings, reference numbers may be re-used to indicate general correspondence between referenced elements.

FIG. 9 shows example functionality of a deformable mirror in a video projector system.

FIGS. 10D-E show examples of a movable refracting element of a sub-pixel generator for a video projector system.

FIG. 10F shows some examples of sub-pixel illumination patterns in a video projector system.

FIGS. 18A-C show an example PCB board and heat sink used with the laser diode light sources illustrated in FIGS. 17A-D.

DETAILED DESCRIPTION

Figure 1A:
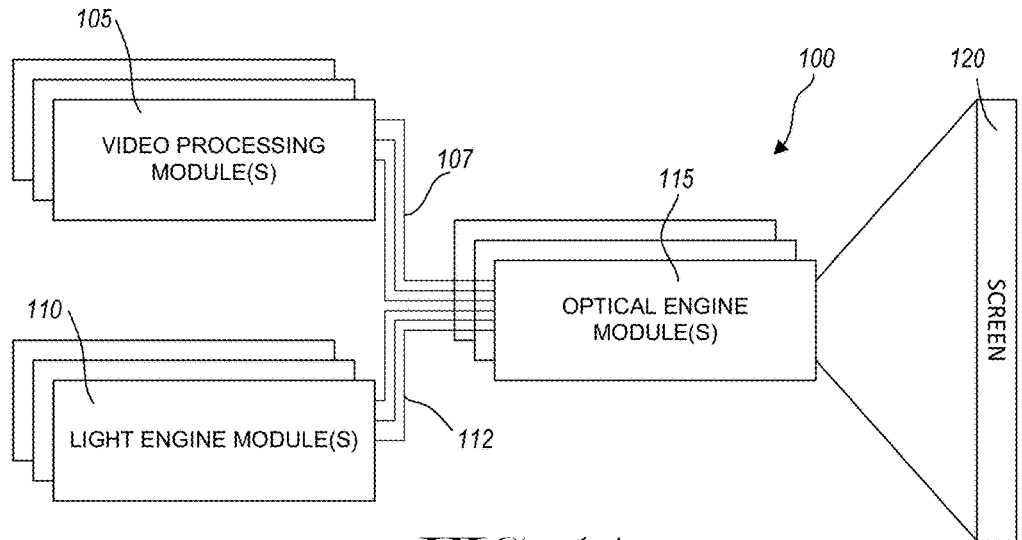
FIG. 1A shows a block diagram of a modular video projector system according to some embodiments.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims that follow this description and not by any particular embodiment described herein.

The following description relates to displaying color video and image from a projector system. Reference is made to red, green, and blue light to enable the creation of color images. Other colors and color combinations can be used to create desired video and images. The disclosure applies to these color combinations as well and the disclosure is not intended to be limited to a certain subset of colors, but for ease of description the colors red, green, and blue are used throughout the disclosure. In addition, while certain embodiments are described as including or utilizing LCoS panels, other types of light modulators may be compatible with embodiments described herein.

Conventional projector systems integrate all their components into one box. In such systems, lamps are typically used to provide light to the projector. Typically xenon or mercury lamps are used. These lamps can generate a relatively large amount of heat and, as a result, utilize expensive or noisy cooling systems. The heat can damage optical or electrical components. Xenon lamps are known to produce infrared radiation which further increases the amount of heat put out by the lamp. Xenon lamps are known to produce ultraviolet radiation as well, which can cause an organic breakdown of materials in lens components, such as breaking down dyes. Typically, it is desirable in such systems to keep the lamp light source close to the modulating components of the projector system to efficiently collect and use the light produced.

Certain projectors described herein use laser light-sources or LED light-sources. According to certain embodiments, the light sources can be physically and/or spatially separated from optical components within the projector, e.g., through the use of fiber optic cables. In some embodiments, lasers or LEDs are selected which emit radiation in a narrow electromagnetic band, and thus do not produce potentially damaging infrared or ultraviolet radiation. In some embodiments, broadband light-sources can be used.

Some projector systems that have all components integrated into a single unit can be difficult to maintain or upgrade. Modular systems described herein allow for updating modules when new technology becomes available without sacrificing functionality of other components within the projector system. For example, a projector system can update laser modules as technology improves, such as green laser diodes which may be inefficient at a certain point in time but which may become more efficient, cost effective, and powerful over time. In addition, modules may be upgraded or rebuilt to exploit new developments in technology. However, for some applications, providing a single unit incorporating all the components used to project a video may be advantageous and desirable because of the ease of setup, compactness, or other such considerations.

In typical projector systems, to increase the light output multiple lamps are added to the projector system which in turn increases the heat in the projector. Such a solution can result in more damage and more power consumed for cooling the projector. Modular laser projector systems described herein can be configured to stack multiple light sources to increase the light input to the modulating elements, e.g., without increasing heat in other elements of the projector system.

In some embodiments, a laser projector system can use coherent light sources for illuminating modulators, including LCoS panels, DMDs, or LCD panels. Using coherent light sources can result in speckle when that light is projected onto an optically rough surface. Speckle is a visible artifact in a projected image and appears as variable intensities or "sandpaper-like" scintillating spots of light. Speckle can be caused by the coherent wave-fronts of light that can constructively and destructively interfere, creating varying bright and dim spots on the screen. Speckle can be one cause that diminishes image resolution and clarity. Therefore, there it may be advantageous to provide a projector system that incorporates highly coherent light sources, such as lasers, and that reduces the appearance of speckle in the projected image.

Overview of a Modular Projector System

FIG. 1A shows a block diagram of a modular video projector system 100 according to some embodiments. The modular video projector system 100 includes various modules used to provide light, video signals, and light modulation to create a video to be displayed on a screen 120. The modular nature of the video projector system 100 provides for various advantages including, but not limited to, facilitating repair, facilitating the upgrading of components or modules, increasing projector light output, providing forward compatibility with future technologies, improving the quality of the video or images displayed, enhancing resolution, providing stereoscopic video, providing compatibility with various video formats, providing redundancy among projector components, decrypting information from protected data inputs, displaying information from a single video source on multiple displays, displaying information from multiple video sources on a single display, reducing speckle, and the like.

The video projector system 100 includes one or more video processing modules 105 configured to provide video signals. The video processing modules 105 provide signals to the optical engine modules 115 through cabling 107, but they could also communicate wirelessly. The video processing modules 105 convert information from one or more video sources to provide video signals to the optical engine modules 115 to at least partially drive the light modulating elements within the optical engine modules 115. In some embodiments, the video processing modules 105 provide input for Liquid Crystal on Silicon (LCoS) panels that modulate light within the optical engine modules 115.

The video processing module 105 can be a unit that processes or receives video data (e.g., from a mass storage device, from a network source, and/or from another external video processing system) and outputs an appropriate signal to the optical engine modules 115. In some embodiments, the video processing modules 105 include inputs to receive video signals from external sources having video processing electronics. For example, an external source can be a REDRAY™ player, computer, DVD player, Blu-Ray player, video game console, smartphone, digital camera, video camera, or any other source that can provide video signals. Video data can be delivered to the video processing modules 105 through conventional cabling, including, for example, HDMI cables, component cables, composite video cables, coaxial cables, Ethernet cables, optical signal cables, other video cables, or any combination of these. In some embodiments, the video processing modules 105 are configured to read digital information stored on a computer readable medium. The modules 105 can be configured to read information on data storage devices including hard disks, solid-state drives (SSDs), optical discs, flash memory devices, and the like. For example, the video processing modules 105 can be configured to read digital video data including, but not limited to, uncompressed video, compressed video (e.g., video encoded on DVDs, REDRAY™-encoded video, and/or video encoded on Blu-Ray disks).

The external sources, optical discs, or data storage devices can provide video data to the video processing modules 105 where such video data includes digital and/or analog information, and where the video data comprises information conforming to a video standard and/or include video data at a particular resolution, such as HD (720p, 1080i, 1080p), REDRAY™, 2K (e.g., 16:9 (2048×1152 pixels), 2:1 (2048× 1024 pixels), etc.), 4K (e.g., 4096×2540 pixels, 16:9 (4096× 2304 pixels), 2:1 (4096×2048), etc.), 4K RGB, 4K Stereoscopic, 4.5K horizontal resolution, 3K (e.g., 16:9 (3072× 1728 pixels), 2:1 (3072×1536 pixels), etc.), "5 k" (e.g., 5120×2700), Quad HD (e.g., 3840×2160 pixels) 3D HD, 3D 2K, SD (480i, 480p, 540p), NTSC, PAL, or other similar standard or resolution level. As used herein, in the terms expressed in the format of ×K (such as 2K and 4K noted above), the "x" quantity refers to the approximate horizontal resolution. As such, "4K" resolution can correspond to at least about 4000 horizontal pixels and "2K" can correspond to at least about 2000 or more horizontal pixels. The modular design of the video projector system 100 can allow for the video processor modules 105 to be updated and/or upgraded providing new or different functionality. For example, a video processing module 105 can be changed or added to change the allowed input formats to the video projector system 100. As another example, the video processing module 105 can be updated to handle video decryption from protected data inputs.

The modular video projector system 100 includes one or more light engine modules 110 configured to provide light to the optical engine modules 115. The light engine modules 110 can comprise one or more light sources configured to provide illumination to the optical engine modules 115 through fiber optic cabling 112. In some embodiments, the light engine module 115 includes light sources (e.g., lasers, LEDs, etc.) configured to provide light that principally falls within the red region of the electromagnetic spectrum, the blue region, and/or the green region. In some embodiments, additional or different colors can be provided including cyan, magenta, yellow, white, or some other color.

The light engine modules 110 can include laser diodes, including direct edge-emitting laser diodes or vertical-cavity surface-emitting laser diodes. In some embodiments, the light sources (e.g., laser diodes) in the light engine modules 110 consume less than or equal to about 8 W of power, less than or equal to about 10 W or power, less than or equal to about 20 W of power, less than or equal to about 25 W of power, less than or equal to about 40 W of power, less than or equal to about 60 W of power, less than or equal to about 100 W of power, between about 8 W and about 25 W of power, between about 20 W and about 30 W of power, or between about 6 W and about 40 W of power during operation. A single light engine module 110 can provide multiple wavelengths of light, typically providing red, green, and blue light from laser diodes. The power consumed by the light sources can be per color (e.g., the ranges and limits above can be per light source) or for the combination of light sources (e.g., all the light sources within a light engine consume power within the limits and ranges above). The power consumed by the light sources can be configured according to a desired size of a screen. For example, the power consumed by the light sources can be between about 6 W and about 10 W, or less than or equal to about 8 W for a screen that has a width that is less than or equal to about 12 feet. The power consumed by the light sources can be between about 10 W and about 100 W, or less than or equal to about 25 W for screens with widths at least about 12 feet and/or less than about 100 feet, or at least about 30 feet and/or less than about 90 feet.

Figure 2:
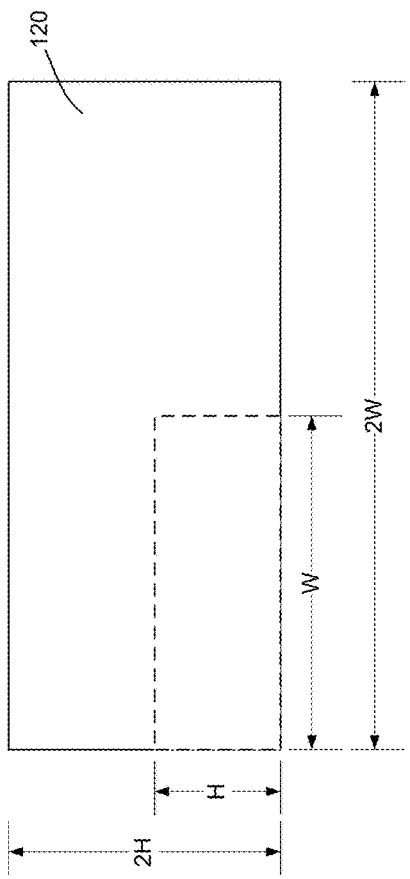
FIG. 2 shows an example of adding additional modules to the modular video projector system to cover a larger display screen.

Light engine modules 110 can be stacked to increase the overall illumination and/or light output of the video projector system 100. FIG. 2 shows an example of adding additional modules to the video projector system 100 to cover a larger display screen 120. FIG. 2 illustrates a screen 120 of a height 2 H and a length 2 W. In this example, a video projector system 100 having a single light engine module 110 can sufficiently illuminate a screen having a height of H and a width of W. Adding three more light engine modules 110 to the video projector system 100, for a total of four, then, can provide enough light to sufficiently illuminate the screen 120 having dimensions 2 H×2 W. This model can be extended to arbitrary screen sizes such that additional light engine modules can be added to create enough light to satisfactorily illuminate the screen 120. In this way, output light power can be tailored as appropriate for different screen sizes. In some embodiments, each light source in a light engine module 110 can sufficiently illuminate a screen that is at least 5 ft. wide. In some embodiments, each light source can sufficiently illuminate a screen that is at least 15 ft. wide.

Adding light engine modules 110 increases the power consumed by the system 100, wherein the total power consumed by the system 100 is the sum of the power consumed by each individual module. For example, a light engine module 110 can consume about 40 W of power. Adding three additional light engine modules 110 having similar light sources and cooling systems would increase the power consumed to about 120 W. In this manner, the power consumption of the video projector system 100 can be scaled to suit the particular application.

Light engine modules 110 having laser or LED light sources provide advantages when compared to light sources such as xenon (Xe) or mercury (Hg) lamps. For example, lasers or LEDs can be stacked in modules, increasing the amount of output light, which output light can be efficiently directed onto a modulating element at least partially through the use of one or more fiber optic cables, for example. Another advantage can be that, because laser and LED light modules typically produce reduced levels of heat, modular projector configurations including additional laser or LED light engine modules can maintain acceptable levels of heat, reducing or preventing increased stress on projector components due to heat. Moreover, modular projector systems can reduce or eliminate the need for expensive and/or noisy cooling systems.

Laser or LED light sources can provide other advantages. For example, laser or LED light sources can provide greater control over colors in output light. Laser sources can provide polarized light, which may be advantageously used in conjunction with LCoS panels and other light modulation systems.

In some embodiments, the light engine modules 110 utilize lasers as the light source. Lasers can provide many advantages, as described herein, but can also contribute to the appearance of speckle in a projected image. To reduce the appearance of speckle, techniques can be used to increase wavelength diversity, angular diversity, phase angle diversity, and polarization diversity which all contribute to reducing the coherence of laser sources.

Wavelength diversity can be achieved by selecting lasers for use in the light engine modules 110 where the lasers have a relatively wide spectral bandwidth. This can be advantageous in reducing speckle because the wavelength diversity reduces the overall coherence of the light arriving at the display screen. In some embodiments, direct edge-emitting laser diodes have a spectral bandwidth of around 3-5 nm, which is relatively wide when compared with diode-pumped solid-state ("DPSS") lasers or direct doubled laser technology which can be as narrow as 0.5 nm to 1 nm. Manufacturing ranges of available wavelengths can vary in about a 15 nm range for each of red, green, and blue lasers. In some implementations, a light source producing light with a center wavelength of about 500 nm can experience a reduction in speckle of about 90% with about a 10 nm spread in its central wavelength.

Wavelength diversity can also be achieved in the projector system 100 through the use of lasers having different, but difficult to perceive, output wavelengths. This can reduce speckle by one over the square root of the number of different wavelengths present for a single color in the projector 100. This can be achieved by building each laser engine module 110 with laser diodes that have a center wavelength spread of a few nanometers. For example, some blue laser diodes can range from about 458 nm to about 468 nm, providing desirable wavelength diversity in the blue region. As another example, green diodes can range from about 513 nm to about 525 nm.

Wavelength diversity can also be achieved by injecting one or more laser sources with a modulation frequency to broaden the output spectral bandwidth. In some embodiments, injecting a laser diode with a modulation frequency in the range of a few to a few hundred MHz increases the spectral bandwidth by about two to three times the original bandwidth. For example, a Green Nichia test diode injected with a modulation frequency in that range increased from a base spectral bandwidth of about 2 nm to about 6 nm. Multiple laser sources can receive differing modulation frequencies, or receiving the same modulation frequency but out of phase with the modulation frequency injected into other sources. This can result in an overall greater diversity in wavelength.

Phase angle diversity can be introduced through the use of multiple emitter sources in the light engine modules 110. By using several uncorrelated and/or non-coherently related sources to make a combined high power light engine module, speckle contrast can be reduced by introducing phase angle diversity. The reduction in speckle can be as much as one over the square root of the number of uncorrelated laser diodes. As an example, a 10 W RGB module can use approximately 4 blue laser diodes, 6 red diodes, and 50 green diodes (wherein green light can typically contribute the most to speckle artifacts) which can reduce the appearance of speckle due to the reduction in coherence of multiple light sources.

Angular diversity can be accomplished in the projector system 100 through the use of multiple emitters for a single light source arranged in a pattern. For example, lasers can be arranged in a radial pattern having a distance between emitters ranging from about 4 mm to about 50 mm. The solid angles subtended by each emitter as it is collimated and then focused into the fiber optic cable will be diverse creating uncorrelated wave-fronts upon entering the fiber optic cable. This angular diversity can result in a reduction in speckle in the final projected image.

Creating polarization diversity is another method to reduce speckle in the laser projector system 100. Laser sources can emit polarized light which can remain largely uniformly polarized even after passing through fiber optic cable. By using multiple emitters for each light engine module 110, and arranging the multiple emitters in a pattern that creates a diversity of polarization angles, speckle can be reduced. This can randomize polarization throughout the optical path of the video projector system 100, useful in a system 100 that uses both horizontal and vertical polarized light, as described in more detail herein.

Some embodiments of a light engine module 110 can utilize multiple methods for reducing speckle by providing for a virtual laser source created by using a large number of smaller lasers. For example, around 100 individual emitters can be used that produce light that is incoherent with each other. Emitters can be chosen which exhibit a wide spectral bandwidth, on the order of about 2 nm. The spectral bandwidth of the emitters can be increased by injecting a RF-modulated signal into the emitters, which can increase the spectral bandwidth to be greater than about 3 nm and/or greater than about 5 nm. The emitters can be arranged in a pattern to create angular diversity, with separations up to about 50 mm, that get funneled into a multimode fiber. Polarization diversity can be introduced by mechanically rotating emitters with respect to one another such that the light that is produced has a varying polarization angle when compared to other emitters. Emitters can be used that have varying, but difficult to perceive, wavelengths. Thus, some embodiments provide for a virtual laser source that reduces speckle through wavelength diversity, polarization diversity, angular diversity, and/or phase angle diversity.

One or more light engine modules 110 can be incorporated into a modular sled configured to be connected to the optical engine module(s) 115. The modular sled can include integrators, mirrors, lenses, and other optical elements for shaping or conditioning the light output before injection into the optical engine module 115. The modular sled can include fiber optic cables configured to carry the light from the light sources to the optical engine module 115. The fiber optic cable can comprise one or more multimode optical fibers, and more than one fiber optic cable can be used to carry the light. In some embodiments, there is one multimode optical fiber per different color in the light source. In some embodiments, there are multiple optical fibers per different color of input light. For example, in some projector systems 100 each color of light in a light engine module 110 can have a single 400 um multimode fiber to transport light to the projector, for a total of three in an RGB module. As another example, in a higher power projector system 100, there can be up to five multimode fibers per color in the light engine module 110, for a total of fifteen in a high powered RGB module. The spacing of the multimode fibers at the output end of the connection can contribute to the reduction in speckle due to angular diversity.

As described, light from the light engine modules 110 can be directed to modulating elements in the optical engine modules 115 using fiber optic cables 112 or other appropriate cabling 112. This feature allows physical and spatial separation of the light source from the optical engine. This could allow a projector head (e.g., the optical engine module 115) to be in one room with the light source (e.g., the light engine module 110) in another, which may be advantageous where noise arising from a cooling system connected to the light source may interfere with the presentation of the video. In some embodiments, the length of the fiber optic cable or other cabling can be greater than or equal to about 10 ft and/or less than or equal to about 100 ft, greater than or equal to about 1 m and/or less than or equal to about 100 m, or greater than or equal to about 3 m and/or less than or equal to about 50 m. In various embodiments, the cabling is from between about 1 m and about 100 m long, or from between about 1 m and about 10 m long.

The use of multimode optical fiber in the projector system 100 can be configured to reduce the overall speckle present in the system. The multimode fiber serves to randomize the various paths light takes as it travels the length of the cable. Multiple internal reflections of the light within the cable create output light where phase angle differences between the light have been randomized. Randomizing phase angles reduces coherence of the light, thereby reducing speckle. Furthermore, the multimode fiber can randomize polarization to introduce polarization diversity which reduces the appearance of speckle.

The video projector system 100 includes one or more optical engine modules 115 configured to modulate light from the light engine modules 110 according to signals received from the video processing modules 105. Some embodiments of a laser projector system 100 provide multiple optical engine modules 115 to provide multiple video or image outputs. For example, two optical engine modules 115 can be used to create two corresponding video streams with orthogonal polarizations to create stereoscopic video. As another example, a video processing module 105 can be used to drive two or more optical engine modules 115 (each optical module 115 having at least one light engine module 110) to display identical data on the screen 120 thereby increasing the brightness of the displayed image on the screen, such as for an outdoor display where four projector heads (and their associated laser modules) display the same data on the screen. As another example, multiple optical engine modules 115 can be used to display a video stream that has a higher resolution than any individual optical engine module 115. This can be accomplished where a video processing module 105 breaks a high resolution video stream into multiple pieces suitable for an individual optical engine module 115. Each optical engine module 115 can then receive a portion of the video signal from the video processing module 105 and display their portion in a defined configuration on the screen 120. As described further herein, some embodiments of the video projector system 100 provide for an individual optical engine module 115 that can create a video stream having a higher effective resolution than is provided by any individual light modulating element present therein.

Figure 3:
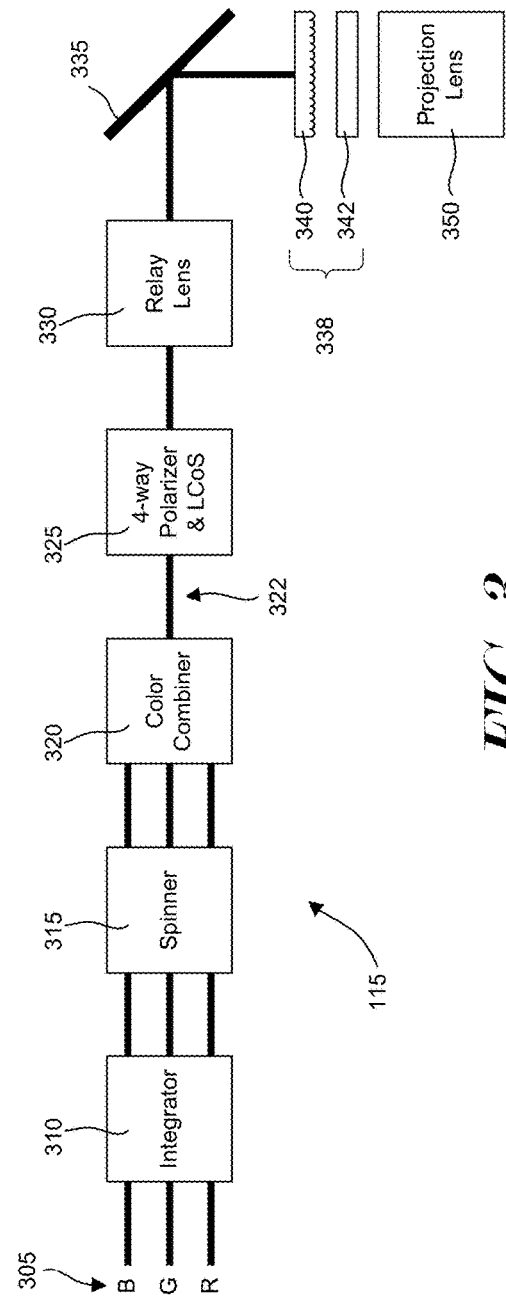
FIG. 3 shows a block diagram of an example optical engine for a video projector, which can be used as an optical engine module in a modular projector system according to some embodiments.

As described more fully herein with reference to FIG. 3, the optical engine module 115 can comprise multiple elements configured to illuminate one or more light modulation panels and direct the modulated light onto a screen 120. The optical engine module 115 can include integrators, lenses, mirrors, prisms, relay lenses, telecentric lenses, projector lenses, spinning prismatic elements, polarizing elements, color combiners, light modulation panels, microlens arrays, movable refracting elements, or any combination of these or other appropriate optical components.

The cables 107 and 112 can be specialized cables including proprietary connectors restricting third party connections to the modular system. Restricting third party access through cables and connectors can protect the projector system 100 from the connection of incompatible equipment that may damage components in the projector system 100. In some embodiments, component access to the projector system 100 is restricted through the use of encrypted connections which require an authentication through the use of a PIN or other identification or authorization means. The cables and connectors 107, 112 can provide the capability to create a modular video projector system 100 by allowing multiple modules to interconnect to create a unified video projector system 100.

Figure 1B:
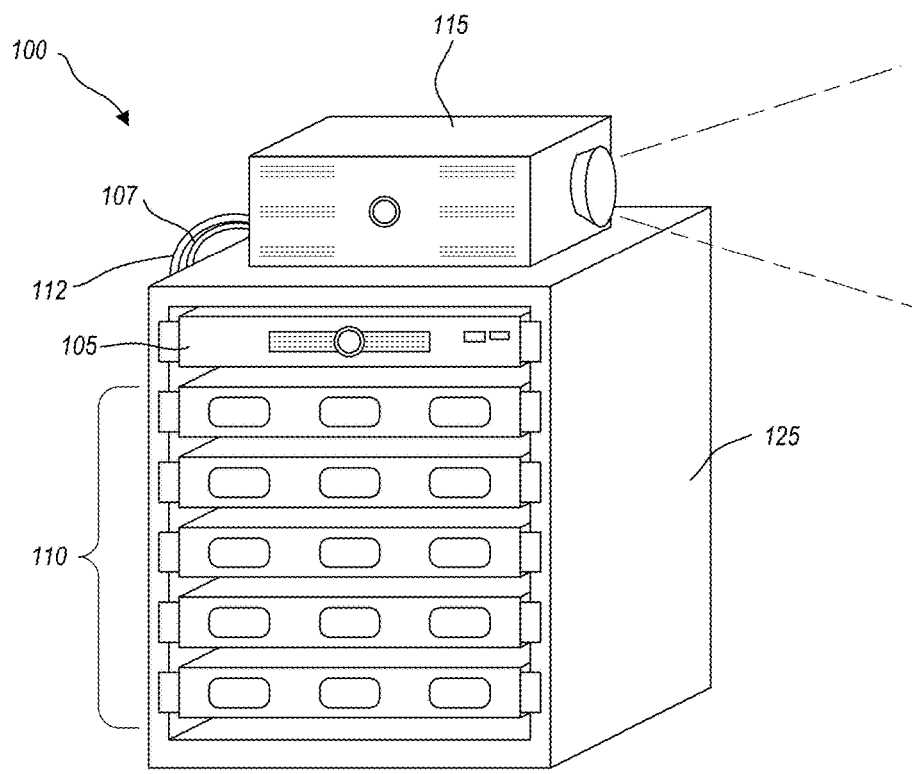
FIG. 1B shows an example embodiment of a modular video projector system with a video processing module, multiple light engine modules, and an optical engine module.

FIG. 1B shows an example embodiment of a modular video projector system 100 with a video processing module 105, multiple light engine modules 110, and an optical engine module or projector head 115. The video processing module 105 and the light engine modules 110 are shown mounted in a rack 125 configured to house the modules. The optical engine module 115 is illustrated as positioned on top of the rack 125, but it can be placed anywhere within reach of the cables 107, 112, and can be in another room from the rack 125 with the modules 105, 110. The video processing module 105 and the light engine modules 110 can be configured to be mountable in such a rack 125 to advantageously provide a system that is easy to setup, configure, and which may be easy to disassemble, transport, and reassemble.

The video processing module 105 can be configured to provide video signals to the optical engine module 115 through the use of one or more cables 107. The video signals can be encrypted such that only the optical module 115 is capable of decrypting the signal.

The light engine modules 110 can each contribute red, green, and blue light to the optical engine 115. The red light from each of the light engine modules 110 can be delivered with a cable comprising a fiber optic bundle with an optical fiber for each red light source in the light engine modules 110. For example, the video projector system 100 comprises five light engine modules 110, each with one source of red light. The cable 112 can include a red light fiber optic bundle comprising five optical fibers carrying the red light from each of the five light engine modules 110, one optical fiber per red light source in the light engine module 115. The blue light and green light from the light engine modules 115 can be delivered to the optical engine module 115 through similar means. As described in greater detail herein, the light from the optical fibers can be integrated together and combined in the optical engine module 115. As illustrated, the video projector system 100 includes five light engine modules 110. Other numbers of light engine modules can be used, including, for example, one, two, three, four, or more than five.

As illustrated in FIG. 1B, the video projector system 100 includes separate modules for producing light, generating video signals, and modulating the produced light. In some embodiments, one or more of these modules can be combined into a single unit or module. For example, a light engine can be combined with an optical engine in the video projector system 100. In such embodiments, the light sources can produce the light that is subsequently modulated by modulation panels within the same housing or structure. The light can be delivered from the light sources using fiber optic cables, as described, or using optical components such as lenses, prisms, and/or mirrors. As another example, a video processor, a light engine, and an optical engine can be combined to form a unitary, integrated video projector system 100. Combining the modules into one or more units may remove certain cabling or communication elements from the above description, but the functionality and general structure largely may remain unchanged. For example, the cabling between the video processor and the optical engine and/or the cabling between the light engine and the optical engine may be removed or modified when these modules are included together in a video projector system 100.

Example Optical Engine Module

FIG. 3 shows a block diagram of an optical engine 115 for a video projector system 100 according to some embodiments. For instance, the optical engine 115 described in FIG. 3 may be compatible with a modular projector system and/or be the optical engine module 115 described herein, e.g., with respect to FIGS. 1-2. As described above, the optical engine module 115 receives light from the light engine 110, receives video signals from the video processor 105, modulates the received light using the received video signals, and projects the resulting video or image for display on the screen 120. The optical engine 115 can utilize various elements suitable for accomplishing the goal of modulating incoming light and projecting an image or video. An example embodiment of an optical engine 115 is described herein having the described elements configured in the described fashion, but this merely represents an example embodiment and other embodiments having different elements configured in different manners are within the scope of the following disclosure.

The optical engine 115 receives light 305 from the light engine 110. As illustrated, the light can be configured to lie within three general wavelength bands falling within the red, green, and blue portions of the visible electromagnetic spectrum, respectively. Other colors and combinations could be utilized as well to achieve a desired brightness, detail, and color for the resulting image and video. The light 305 can be delivered to the optical engine 115 through optical fiber, including single mode or multimode fiber, or through other means. As described herein, the use of multimode fiber can result in a reduction in speckle due to phase angle diversity and angular diversity.

Example Integrator

The received light 305 is first passed into an integrator 310. The integrator 310 can be configured to homogenize the light 305. The integrator 310 can also increase the angular diversity of the light 305 to reduce speckle. In some embodiments, the integrator 310 is a hollow or solid internally reflective light pipe which uses multiple reflections to convert incoming light into a uniform rectangular pattern of outgoing light. The integrator 310 can be used to improve uniformity of light over a surface, such as a modulating panel, and efficiently match the aspect ratio of the illumination source to the modulating panel.

In some embodiments, the integrator 310 includes a horizontal dispersing homogenizing rod and a lenticular lens array. The lenticular lens array can increase angle diversity of the light source by dispersing the incoming light over a multitude of angles. For example, two lenticular diffusers can be used in the horizontal and vertical directions before and after the homogenizer, creating an angular splitting of the output light rays in a widened "fan," spatially integrating the light into a flat field across each modulating element. As a result, the optical engine can reduce the appearance of speckle. In some embodiments, the integrator 310 includes a homogenizing rod and a rotating or vibrating phase-shift disk. By introducing time-varying phase shift in the rays of light moving through the integrator 310, speckle reduction can be improved by effectively averaging out the spatial and temporal coherence between each successive scan of the light source. The integrator 310 can also include other optical elements configured to distribute light from the light source uniformly over a defined area. For example, the integrator can include mirrors, lenses, and/or refracting elements, designed to horizontally and vertically distribute light. Some embodiments provide separate homogenizing optics for each incoming color of light 305.

Example Slit-Scanning System

Figure 4:
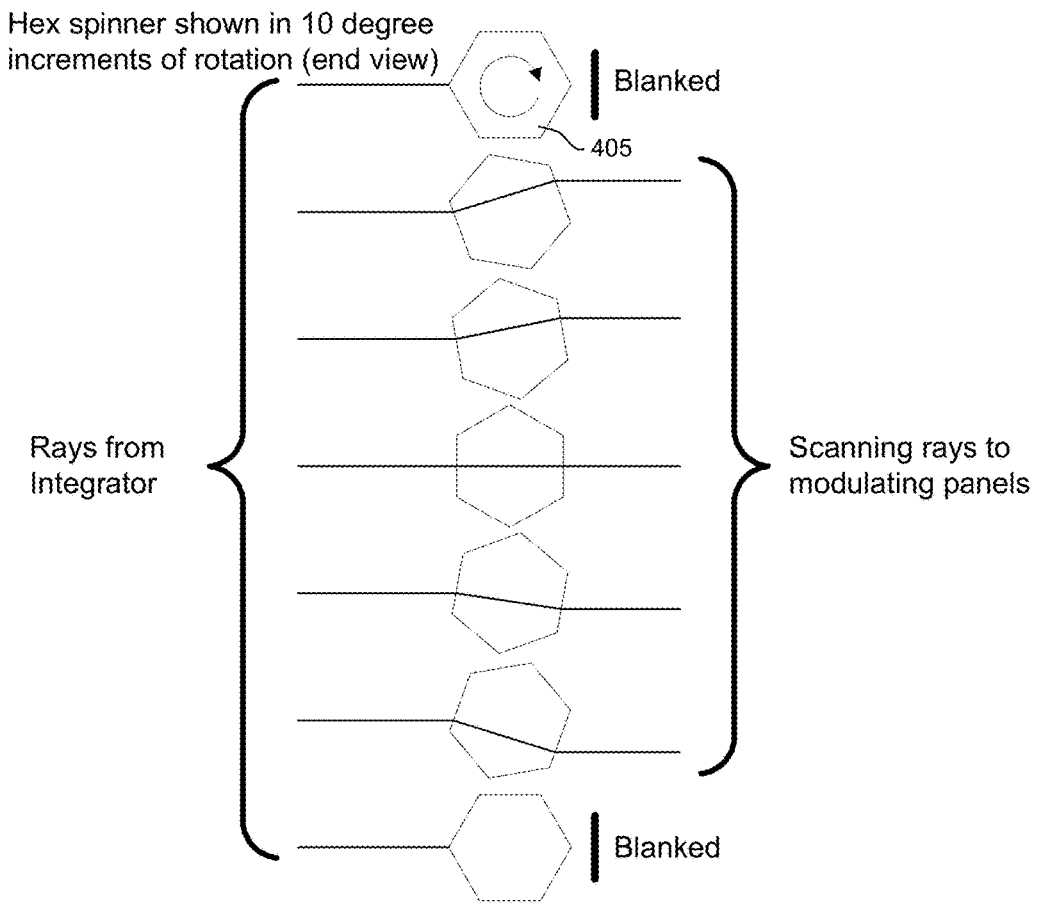
FIG. 4 shows an example of a slit scanning system in a video projector system.

Light leaving the integrator 310 can then be transmitted to the spinner 315. In some embodiments, the light from the integrator 310 is partially or completely focused on or within the spinning element in the spinner 315. FIG. 4 shows an example of a slit scanning system 315 in a video projector system 100. The spinner or slit scanning system 315 includes a refracting polygon 405 configured to rotate at a determined rate. When the light passes through the spinning element 405, the light is refracted, and the spinning of the element changes the vertical or horizontal position of the light upon exiting the spinner 315. As illustrated in FIG. 4, the rays from the integrator 310 are scanned from an initial position to a final position according to the rotation of the spinner 405. Some embodiments provide for spinning elements 405 for each incoming color of light from the integrator, as described more fully herein with reference to FIG. 6.

In some projector systems, different colors of light are sequentially transmitted onto an entire (or substantially entire) modulating panel. In some slit-scanned embodiments, a hex-spinner 405 is used to allow slits of red, green, and blue light, intermixed with blank or black periods or black, to scan across a modulating panel. Each slit may include a subset of one or more adjacent rows, for example (e.g., 1, 2, 3, 5, 10, 100, 180, 200 or more rows). In some embodiments, the number of rows covered by a slit is a fraction of the image height, and can be, for example, about ⅓rd of the image height, about ¼th of the image height, about ⅙th of the image height, about ⅛th of the image height, about 1/12th of the image height, or some other fraction. As an example, the image height is 1080 rows, and the slit comprises 180 rows. The mark to space ratio can be defined based at least in part on a settling time of the modulating panel, which relates to the speed at which successive frames can be scanned. Some advantages of the slit-scanned implementation include that the effective frame rate is increased by a factor of three or about three because red, green, and blue are displayed three times during the time it takes sequentially-scanned projector systems to display each color once. Another advantage can be reduction or elimination of chromatic aberration when compared to sequentially-scanned projector systems which may display a perceptible offset of red, green, and blue portions of a fast moving image.

Figure 5:
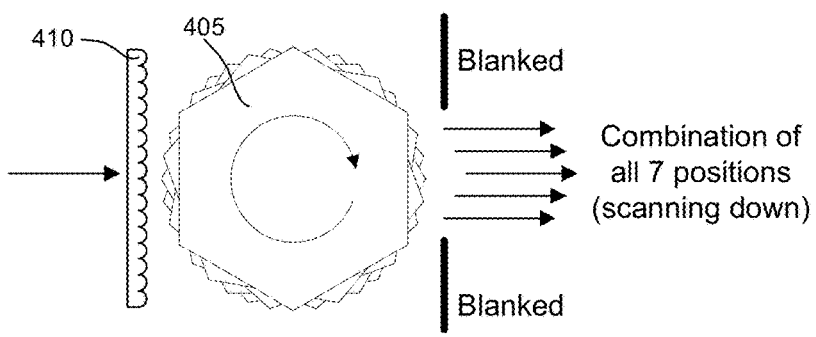
FIG. 5 shows a spinner in combination with a microlens array scanning a light source in a vertical direction.

In some embodiments, the spinner 405 is coated to reduce speckle. The coating on the spinner 405 can increase angular diversity by diffusing the light. The coating on the mirror may also introduce artifacts into an image by making the edges of the light received from the integrator 310 spread out. In some embodiments, a microlens array 410 is included before the spinner 405, as illustrated in FIG. 5. The microlens array 410 can increase angular diversity, and thus reduce speckle, by dispersing the light and spreading it out over a larger angular range. In some embodiments, the microlens array 410 is a lenticular lens oriented such that the lenticules are oriented parallel to the axis of rotation of the spinner 405. In some embodiments, a microlens array can be included after the spinner 405 in the optical path of the projector, instead of or in addition to being included before the spinner 405.

FIG. 5 shows a hexagonal spinner 405 in combination with a microlens array 410 scanning a light source in a vertical direction. The light first enters the microlens array 410 to introduce angular diversity and reduce speckle. The light then gets refracted by the hexagonal spinner 405 to be scanned as a slit across a modulating panel (not shown).

Figure 6:
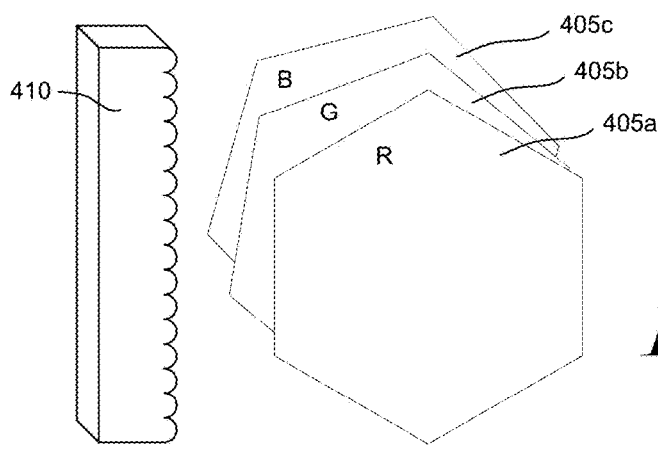
FIG. 6 shows an embodiment of a spinner system in combination with a microlens array and having one spinner for each of a red, green, and blue light source.
Figure 7:
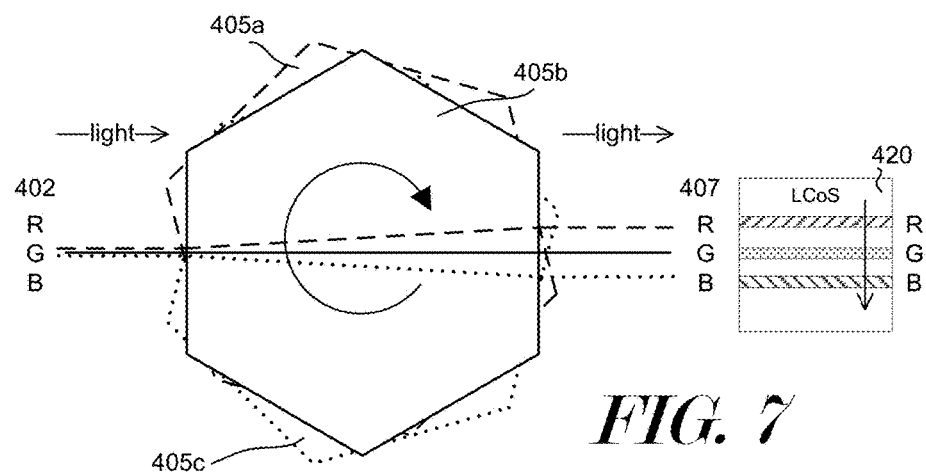
FIG. 7 shows an example slit scanning system scanning a red, green, and blue light source vertically across a modulating panel.

FIG. 6 shows some embodiments of a spinner system 315 in combination with a microlens array 410 and having one spinner 405a-c for each of a red, green, and blue light source. The spinners 405a-c are offset from one another in angle so that each corresponding color is refracted at a different angle. FIG. 7 shows a slit scanning system 315 scanning a red, green, and blue light source 402 vertically across an LCoS panel 420. The spinning elements 405a-c are offset from one another in phase such that bands of red, green, and blue are scanned down the LCoS modulating panel with each color being incident on a different portion of the LCoS panel at any given time. The speed with which the scanning of the various color occurs can result in a viewer's brain blending the colors and perceiving a spectrum of colors. Furthermore, the bands of light 407 exiting the spinning elements are spatially separated meaning that there are gaps between the bands of light where there is substantially no light from the light source. Such gaps between the bands of light can be sufficiently large to provide the elements of the LCoS panel enough time to recover (e.g., reset or otherwise regain the ability to effectively modulate light) during the time that there is no red, green, or blue light incident thereon. An advantage of this configuration is that one modulating panel can be used to modulate red, green, and blue light without requiring a separate modulating panel for each.

Example Color Combiner

Referring again to FIG. 3, the light leaving the spinner 315 can be transmitted to a color combiner 320. The color combiner 320 can be configured to combine the light paths of the three separate colors into a single light path 322. In some embodiments, the color combiner 320 includes an optical delay compensator, one or more right angle prism(s) configured to direct light from different paths into a color combiner cube, wherein the color combiner cube is configured to direct the light onto a common optical path. In some embodiments, the color combiner 320 includes additional optical components, including elements configured to provide a telecentric focus. In some embodiments, the combined light will travel along a common light path, but still be offset from one another vertically, horizontally, or diagonally. As described herein, the offset between the colors can be used to sequentially scan the light across modulating panels.

Example Polarizer and Modulator

Figure 8A:
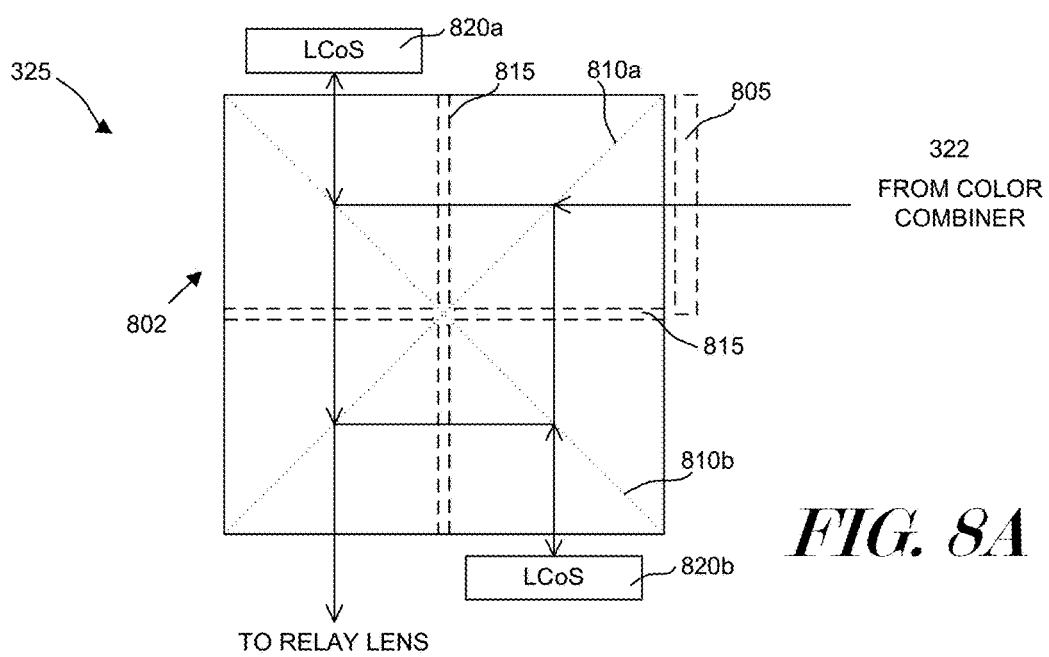
FIG. 8A shows a four-way polarizing element and dual modulating panels according to some embodiments.

Returning to FIG. 3, the combined light 322 leaving the color combiner 320 can be transmitted to a four-way polarizer and light modulating panel 325. FIG. 8A shows a four-way polarizing element 802 and dual LCoS panels 820a, 820b according to some embodiments. The optical engine 115 can be configured to utilize vertically polarized light in addition to horizontally polarized light. Some projector systems do not use both polarizations and can lose efficiency and luminosity as a result. Thus, the polarizer 325 can manipulate the light from the color combiner 322 such that both vertical and horizontal polarization is present. In some embodiments, the different polarizations can be used in stereoscopic applications or to increase a brightness of a displayed image or video. In some embodiments, the dual LCoS panels 820a, 820b can be offset from one another or produce pixel data that are offset from one another to enhance or double resolution.

The polarizer and modulator 325 can include a quarter wave plate 805 configured to rotate the polarization of the light 322. The polarizer and modulator 325 can include broadband beam-splitting polarizers 810a and 810b. The beam-splitting polarizers 810a, 810b can be configured to split the incident beam into two beams of differing linear polarization. Polarizing beam splitters can produce fully polarized light, with orthogonal polarizations, or light that is partially polarized. Beam splitting polarizers can be advantageous to use because they do not substantially absorb and/or dissipate the energy of the rejected polarization state, and so they are more suitable for use with high intensity beams such as laser light. Polarizing beam splitters can also be useful where the two polarization components are to be used simultaneously. The polarizer and modulator 325 can also include half-wave polarization rotators 815 configured to change the polarization direction of linear polarized light.

In some embodiments, the polarizer and modulator 325 includes two LCoS light modulating panels 820a, 820b. This allows the optical engine module 115 to drive the panels identically and combine the modulated light at output, thereby maintaining and using both orthogonal polarizations of the incoming light. As a result, the video projector system 100 can efficiently use the light provided by the light engine 110. In some embodiments, the LCoS panels 820a, 820b are driven differently for stereoscopic use or for increasing or enhancing resolution. In some embodiments, the LCoS panels 820a, 820b produce pixels that are offset from one another to enhance resolution.

Figure 8B:
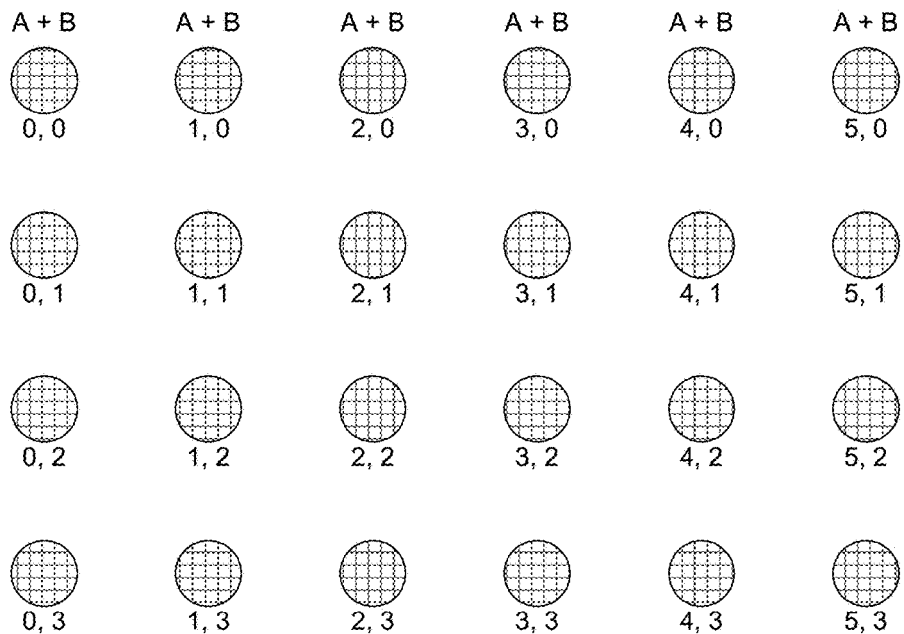
FIG. 8B illustrates an example configuration of pixels generated by two LCoS panels wherein corresponding pixels from the two LCoS panels are aligned.

In some embodiments, the two LCoS light modulating panels 820a, 820b have the same or substantially the same number of pixels and pixel configuration. In certain embodiments, the polarizer and modulator 325 is configured to combine light from corresponding pixels from the two LCoS light modulating panels 820a, 820b to form a single output pixel. For example, as illustrated in FIG. 8B, a first LCoS panel 820a (panel "A") and a second LCoS panel 820b (panel "B") can have a matrix of pixels where the number and configuration of pixels in the two panels are substantially identical (e.g., for clarity and simplicity in the illustrations in FIGS. 8B and 8C, each panel has a matrix of pixels that is 4×6). The polarizer and modulator 325 can combine modulated light from a first pixel in the LCoS light modulating panel 820a (e.g., pixel A0,0) and modulated light from a corresponding first pixel in the LCoS light modulating panel 820b (e.g., pixel B0,0) to form a single pixel (e.g., pixel A+B0,0). The polarizer and modulator 325 can do this for all pixels in the panels, e.g., combining pixels A0,0 through A5,3 with corresponding pixels B0,0 through B5,3 to form A+B0,0 through A+B5,3. As described herein, this can be used, for example, to increase an output light intensity or for stereoscopic use.

Figure 8C:
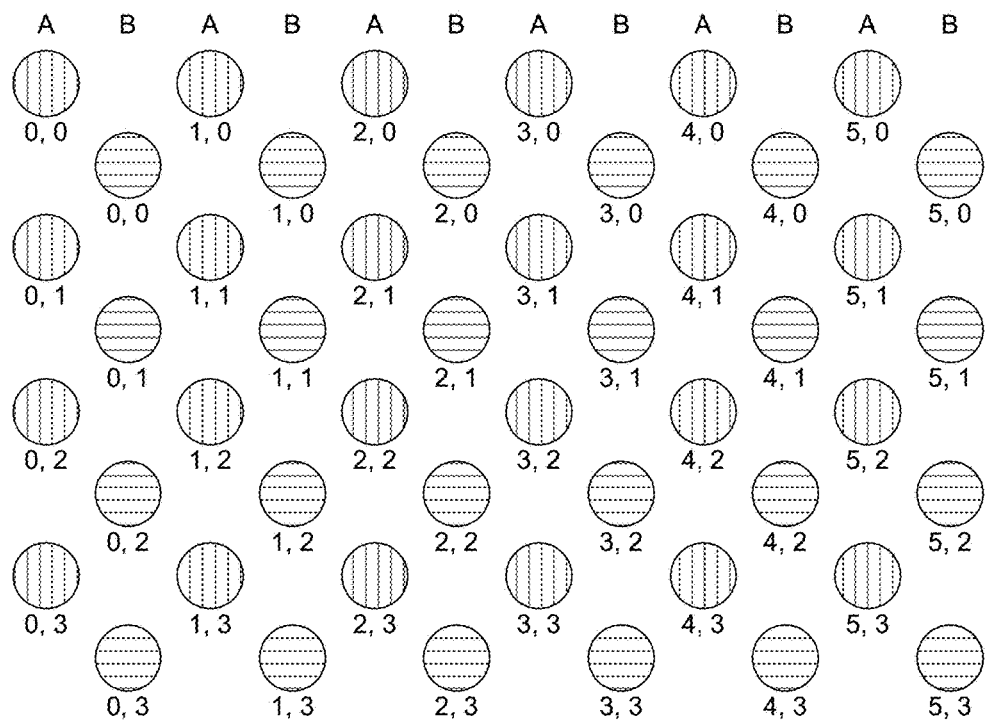
FIG. 8C illustrates an example configuration of pixels generated by two LCoS panels wherein corresponding pixels from the two LCoS panels are offset.

In certain embodiments, the polarizer and modulator 325 is configured to display light from corresponding pixels from the two LCoS light modulating panels 820a, 820b as two output pixels. As illustrated in FIG. 8C, the polarizer and modulator 325 can horizontally and vertically offset modulated light from a first pixel in the LCoS light modulating panel 820a (e.g., pixel A0,0) and modulated light from a corresponding first pixel in LCoS light modulating panel 820b (e.g., pixel B0,0) to form two output pixels (e.g., pixel A0,0 and B0,0) that are horizontally and vertically offset from one another. The polarizer and modulator 325 can do this for all pixels thereby generating an output image or video having a resolution that is doubled. For example, resolution can be doubled by offsetting the LCoS light modulating panel 820a half a pixel relative to the LCoS light modulating panel 820b. FIG. 8C illustrates such an example where an output image comprises 48 pixels generated using two LCoS panels each having 24 pixels.

The modulated light from corresponding pixels in the two LCoS light modulating panels 820a, 820b can be offset horizontally, vertically, or diagonally upon exiting the polarizer and modulator 325. In some embodiments, to offset the modulated light, the two LCoS light modulating panels 820a, 820b can be physically offset from one another such that optical paths through the polarizer and modulator 325 for corresponding pixels in the two panels are horizontally, vertically, or diagonally offset from one another. In certain embodiments, the LCoS light modulating panels 820a, 820b can be coupled to a moving element (e.g., an actuator) that can move one or both of the LCoS light modulating panels 820a, 820b to be alternatively aligned or offset. In some embodiments, to offset the modulated light, the combination of optical elements in the polarizer and modulator 325 can be configured to create optical paths for the LCoS light modulating panels 820a, 820b that result in corresponding pixels that are horizontally, vertically, or diagonally offset from one another. The optical elements in the polarizer and modulator 325 can be configured to move or otherwise change properties such that modulated light from corresponding pixels in the LCoS light modulating panels 820a, 820b can be alternatively aligned or offset.

Returning to FIG. 3, the modulated light from the polarizer and modulator 325 can be transmitted to a telecentric relay lens 330. The telecentric relay lens 330 can be configured to invert an image and extend an optical tube. The telecentric lens 330 can be configured to leave the image size from the polarizer and modulator 325 unchanged with object displacement. The telecentric relay lens 330 can be advantageously used to maintain the luminous characteristics of the modulated image leaving the polarizer and modulator 325.

Example Deformable Mirror

The light from the relay lens 330 can be transmitted to a deformable mirror 335. The deformable mirror 335 can be configured to correct lens distortion in the optical engine 115. In some embodiments, the deformable mirror 335 reflects light from the relay lens 330 to a microlens array 340. When the microlens array 340 is at a focus of the light leaving the deformable mirror 335, it can be desirable to correct lens distortion which, if left uncorrected, may cause light to fall between elements of the microlens array 340 resulting in a moiré pattern.

FIG. 9 shows example functionality of a deformable mirror 335 in a video projector system. In some embodiments, a noise source is applied to the deformable mirror 335 to randomize or create variation in wave-fronts incident thereon, as illustrated in the graphic on the right in FIG. 9. For example, the noise source can perturb the deformable mirror 335 through modulated RF signals, through lower frequency signals, or through some other source of random or pseudo-random electromagnetic or acoustic signals. Randomizing the wave fronts can advantageously increase phase angle diversity and reduce speckle.

Example Microlens Array and Sub-Pixel Generator

Returning to FIG. 3, the light reflected from the deformable mirror 335 can then be incident on a sub-pixel generator 338 comprising a microlens array 340 and a wobbler 345. In some embodiments, the microlens array 340 can be configured to reduce the size of each pixel to a fraction of its original size. For example, the microlens array 340 can be configured to reduce the size of the pixel to one-fourth of its original size, half of its original size, one-third of its original size, one-eighth of its original size, one-sixteenth of its original size, or some other fraction. The wobbler 345 can be configured to move such that the light rays corresponding to pixels from the microlens array 340 are translated in space corresponding to the movements of the wobbler 345.

Figure 10A:
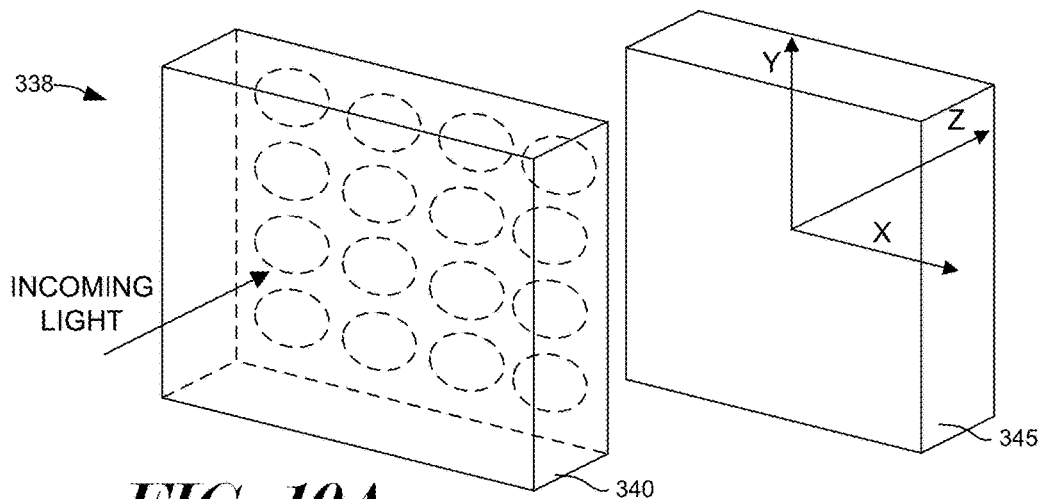
FIGS. 10A-C show some embodiments of a sub-pixel generator.
Figure 10B:
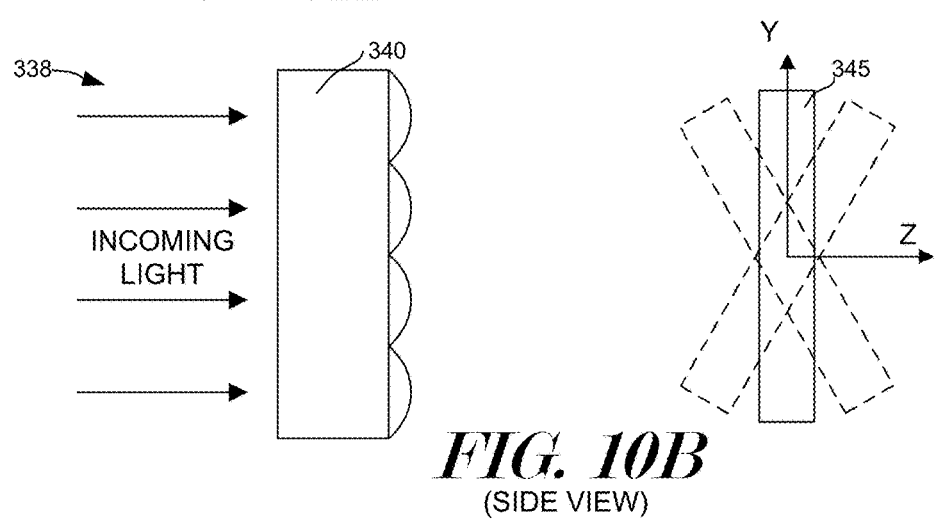
Figure 10C:
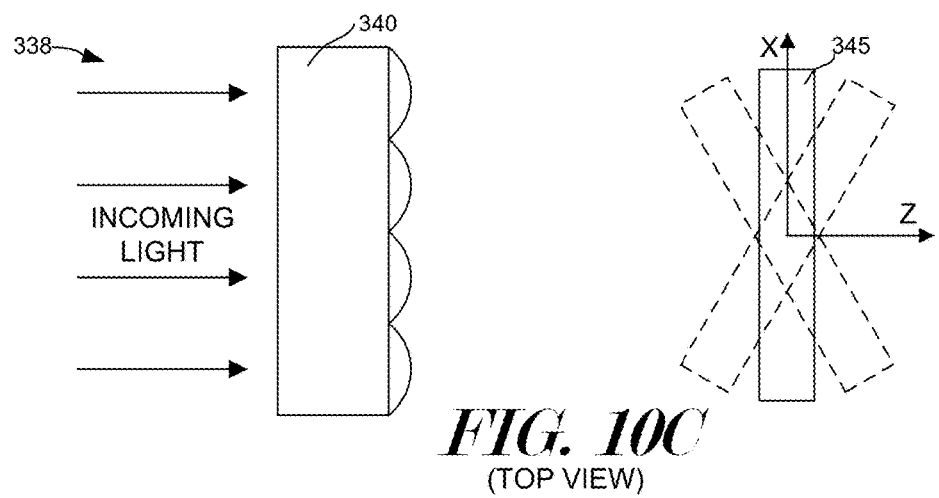

FIGS. 10A-C show some embodiments of a sub-pixel generator 338 comprising a microlens array 340 and a wobbler 345. The wobbler 345 can be a material that has desirable transmissive properties and that refracts light in a desired fashion (e.g., a transparent piece of glass). Incoming light passes through the microlens array 340 and the pixel size is reduced to a fraction of its original size. The wobbler 345 then moves the reduced-size pixel to a desired location. The wobbler generator 345 can be configured to move in two or three dimensions. Speckle can be reduced through the combination of these elements due to increased angular diversity and temporal averaging and spatial coherence destruction. Angular diversity is created when moving the reduced-size pixel to different locations on the screen. Temporal averaging of contrast and destroying spatial coherence arises from repeatedly moving the reduced-size pixel within a resolved spot.

FIGS. 10D-E show embodiments of the sub-pixel generator 338 with different mechanisms that cause the wobbler 345 to move. In FIG. 10D, the wobbler 345 is attached to a spinning axle 370 in a plane that is not perpendicular or parallel to the axis. Because the wobbler 345 is not oriented perpendicular to the spinning axle, but is instead oriented at some non-right angle with respect to the spinning axle, the wobbler 345 wobbles (as indicated by the dashed line), and when light is incident on the wobbler 345, it is refracted in a known pattern. In FIG. 10E, the wobbler 345 has actuators 375 attached to its corners. The actuators 375 can be configured to move the wobbler 345 in various patterns such that the reduced-size pixel is translated as well. FIG. 10F illustrates example patterns for a pixel that has been reduced in size to one-quarter of its original size. The reduced-size pixel can be moved in a square, circle, FIG. 8, infinity shape, or some other shape. In some embodiments, the wobbler 345 of the sub-pixel generator 338 can move the reduced-size pixel to two locations, three locations, four locations, eight locations, sixteen locations, or another number of locations according to any suitable movement pattern. The movement pattern can be repeated to display video or images having an enhanced resolution, as described herein. In some embodiments, the number of locations is inversely proportional to the size of the reduced pixel. For example, where the pixel is reduced to half the size of the original pixel, the reduced pixel can be moved to two locations. Where the pixel is reduced to one-eighth its original size, the reduced pixel can be moved to eight locations. Thus, the area covered by the original pixel can be substantially covered by the reduced-size pixel when moved to the configured locations within the area. In this manner, the effective resolution can be increased by 2×, 4×, 8×, 16×, 32×, 64× or more.

In some embodiments, the optical engine 115 can receive a signal from the video processor 105 and convert the resolution into a higher resolution through interpolation of pixel information. In some embodiments, the optical engine 115 can display video information received from the video processor 105 that has a resolution that exceeds the resolution of the modulating panels within the optical engine 115. For example, the optical engine 115 can take spatially modulated light and combine it to make a higher resolution using the sub-pixel generator 345. For example, the LCoS imagers having 1920×1080 pixels can be configured to produce 2D/3D Quad-HD (3840×2160) resolution. The optical engine 115 can include circuitry and processing electronics that receive the video signal from the video processor 105 and generate a modulation signal for the modulating panels. For example, the video processor 105 can deliver 4 k video data to the optical engine 115. The optical engine electronics can time multiplex the signal to generate a sequence of signals configured to drive one or two 1 k modulating panels to reproduce the 4 k video data received from the video processor 105 when the modulated light is shown in succession.

The sub-pixel generator 338 can be configured to enhance the resolution of the modulating panels, such as an LCoS panel. As an example an LCoS panel can have 1920 horizontal pixels by 1080 vertical pixels. The microlens array 340 can gather light from the color combiner 320, or other element, and substantially focus it into a central portion of each pixel on the LCoS panel. The result would be an array of 1920×1080 reflected pixel images, each a quarter of the size of an LCoS pixel. The wobbler 345 can then be moved in such a way that the reduced-size pixels moved left and right by one-quarter pixel and up and down by one-quarter pixel, the result would be a collection of four one-quarter-sized pixels filling the space that a full-sized pixel would have occupied absent the microlens array 340. Displaying the four sub-pixels in rapid succession could then create effectively higher resolution displayed video. For instance, the projector system can display the video data at least about the native resolution of the input data (e.g., 3840×2160). Moreover, because of the relative speed with which the LCoS can be refreshed due at least in part to the slit-scanning method outlined herein, the LCoS panels can refresh at a relatively high rate (e.g., about 240 Hz). Thus, according to some embodiments, the optical engine 115 can display video having an effective resolution of 3840×2160 pixels and an effective frame rate of about 60 Hz.

In some embodiments, LCoS panels can be offset from one another, effectively doubling the resolution of the system, as described herein with reference to FIG. 8C. Moreover, as discussed with respect to FIGS. 10A-10I, the sub-pixel generator 338 can be used to enhance the resolution of the offset LCoS panels by reducing the size of a pixel (e.g., to one-quarter of the original size) and moving the sub-pixel to multiple (e.g., four locations) in rapid succession. These techniques may be combined in some cases. As one example, the panels are offset, the pixel size is reduced to half the size, and the sub-pixel is moved to two locations, resulting in a resolution that is four times the native resolution of a single LCoS panel. In this example, the effective frame rate is twice the effective frame rate relative to the situation described above where the LCoS panels are aligned and the sub-pixel generator 345 moves quarter-sized sub-pixels to four locations for a single output frame. For example, using vertically offset 1920×1080 LCoS panels (e.g., offset by ½ the distance between the pixels) that can refresh at about 240 Hz, the optical engine 115 can display video data having a resolution of 1920×2160 with an effective frame rate of 240 Hz without using the sub-pixel generator 345 and the microlens array 340 because each pixel of the two LCoS panels is displayed once per output frame. The optical engine 115 can display video having a resolution of 3840×2160 with an effective frame rate of 120 Hz by using the sub-pixel generator 345 and the microlens array 340 to reduce the size of output pixels from the LCoS panels and move them horizontally such that the optical engine 115 displays each pixel of the two LCoS panels twice per output frame to enhance resolution.

The following illustrates an example method of enhancing resolution using a video projector system 100 having two diagonally offset panels in an optical engine 115. The projector system 100 can receive or produce in the video processor 105 a source signal having a first resolution (e.g., 7680×4320, 3840×2160, 1920×1080, etc.). The video processor 105 can subsample the source signal as two horizontally and vertically interleaved signals having a second resolution that is half of the first resolution. As a result of the subsampling, the video processor 105 can produce two video or image streams with interleaved pixels, similar to the configuration illustrated in FIG. 8C. The video processor 105 can then encode the two subsampled signals as two synchronized image streams. The video processor 105 can send the two synchronized image streams to the optical engine 115 which has two diagonally-offset LCoS panels that each have one-fourth the number of pixels of the source signal and one-half the number of pixels of the subsampled signals. Using the sub-pixel generator 345 to size and move the output of the LCoS panel pixels, the optical engine 115 can recreate the two interleaved images, each having the same resolution as the subsampled signal. The optical engine 115 can then display the synchronized interleaved images to substantially emulate the original source signal.

Figure 10H:
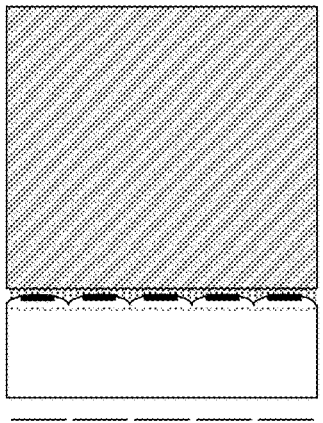
FIGS. 10G-I show examples of a sub-pixel generation using a microlens array and a movable light modulating panel.
Figure 10G:
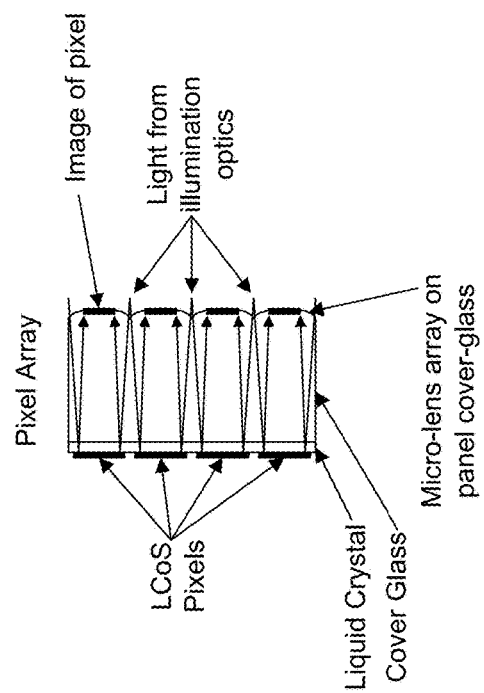
Figure 10I:
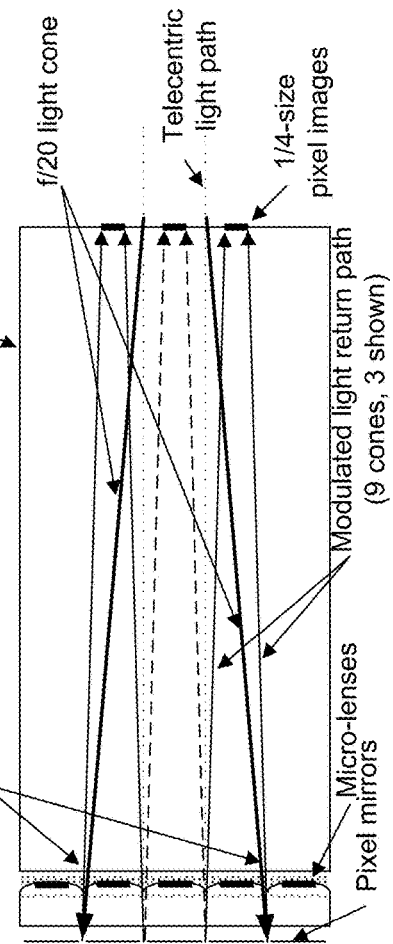
Figure 10J:
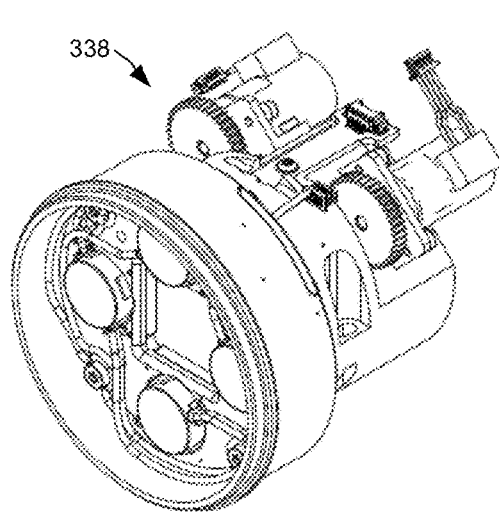
FIGS. 10J-M show various views of an example wobbler of a sub-pixel generator for a video projector system.
Figure 10K:
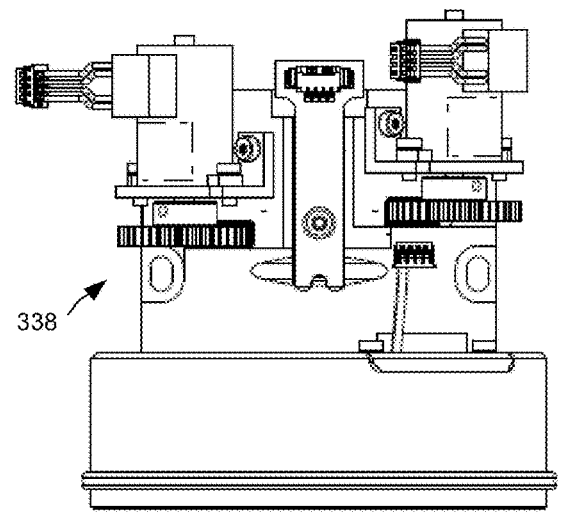
Figure 10L:
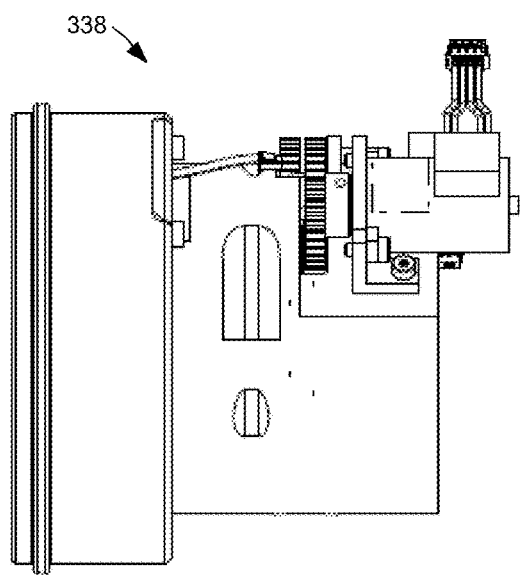
Figure 10M:
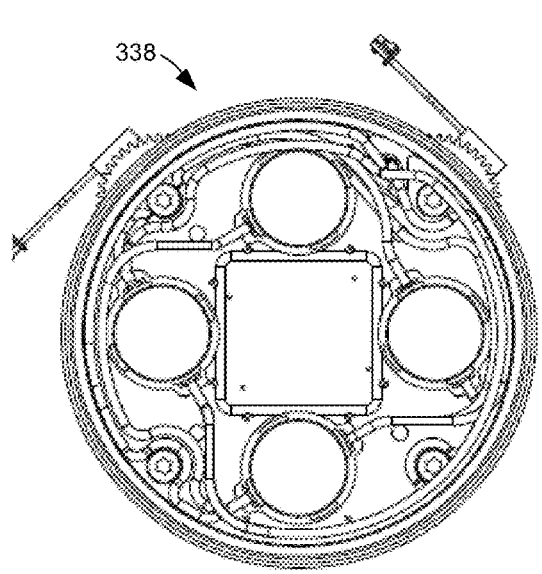

In some embodiments, moving the reduced-sized pixel is accomplished by moving the modulation panel, the microlens array, or both. FIGS. 10G-I show example embodiments having a microlens array in front of a light modulation panel. A microlens can be placed in front of each pixel using a microlens array. The lens can be configured to gather light incident thereon and focus it into a central portion of each pixel. The light would then reflect off the pixel mirror and return to the lens surface where an image of the pixel would be resolved by another optical component, such as a projection lens. The resulting imaged pixel would be a fraction of the size of pixel on the panel. The panel could then be moved in such a way that the pixels move left, right, up, and/or down to form a collection of reduced-sized pixels filling the space that a full-sized pixel would have occupied.

FIG. 10G shows a cross-section of a small portion of an LCoS panel with a microlens array disposed on one side. Moving from left to right, first the panel pixels are shown. Next to the LCoS pixels is the liquid crystal, then the cover glass. The cover glass has a microlens surface to the right side of the cover glass. This microlens array has a focal length such that the light from the illumination optics is reflected off of the pixel and imaged at half-size on the lens surface. FIG. 10H is another example embodiment of a LCoS panel having a cover-glass thickener to stiffen the cover glass. FIG. 10I shows an example optical path of light starting from the entrance of light that would cover one pixel if the beam were telecentric, as shown by the light dotted lines. With the beam having a relative high F/#, such as f/20, the illumination spreads from the one-pixel size at the entrance to the cover glass to covering a 9-pixel area at the pixel mirror surface. The microlenses of the eight surrounding pixels orient the rays to be telecentric on each of their respective pixels. The rays are then reflected off of the pixel mirror surface and returned to the surface of the micro-lens where the ¼ size pixel image is formed. The LCoS panel can be configured to be moved such that the resulting pixel image moves in a defined configuration. A projection lens can be focused on the micro-lens surface, with the resulting image being projected on a screen. By scanning the quarter pixels in four different locations at a suitable rate, the projector system can display images having an enhanced resolution. In some embodiments, the microlens array is configured to perform an f-number conversion. For example, the microlens array can convert from about an f-number of 17 to an f-number that matches the projection lens (e.g, an f-number of about 4). This can reduce speckle in the system through introduction of additional angle diversity.

Figure 10N:
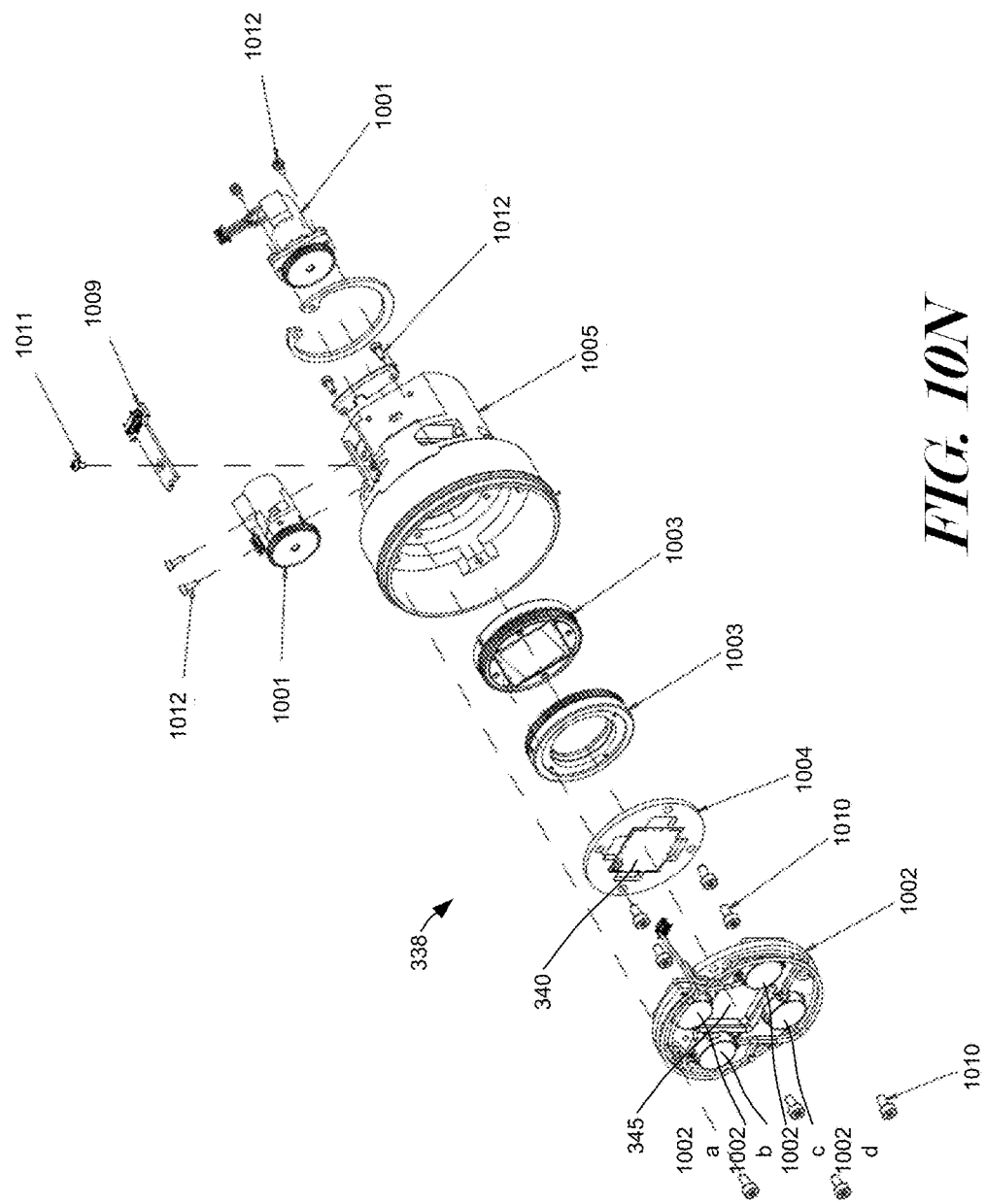
FIG. 10N shows an exploded view of the wobbler illustrated in FIGS. 10J-M.

FIGS. 10J-M show various views of an example sub-pixel generator 338 for a video projector system 100. FIG. 10N shows an exploded view of the sub-pixel generator 338 illustrated in FIGS. 10J-M. In the illustration, modulated light enters from the upper right of the drawing and exits the sub-pixel generator 345 at the lower left.

The sub-pixel generator 338 includes housing 1005. Within the housing, the sub-pixel generator 338 includes a plate 1004 configured to hold a microlens array 340. The micro-lens array is positioned to receive modulated light from the LCoS panels, after a relay lens, and to reduce a size of the pixel. The sub-pixel generator 338 includes a speaker plate 1002 with four speakers 1002a, 1002b, 1002c, 1002d, located thereon. On the opposite side of the speaker plate 1002, there is mounted a refractive element 345 with corners attached to the opposite side of the speakers 1002a, 1002b, 1002c, and 1002d. The refractive element 345 can be any suitable material and can have a thickness between about 2 mm and about 4 mm, between about 1 mm and about 5 mm, or between about 0.5 mm and about 7 mm. The speakers 1002a, 1002b, 1002c, and 1002d receive an electrical signal that causes the speakers to oscillate or vibrate. This oscillation or vibration moves the refractive element 345 in a pattern to move the sub-pixels produced by the microlens array 340 to various positions.

The movement of the refractive element 345 can be substantially continuous and it can move in a repeating pattern, as described with reference to FIG. 10F. The frequency of the pattern can be related to a frequency of the spinner element. In some embodiments, the frequency of the movement of the refractive element 345 can be independent of the frequency (or frame rate) of the input video data. This can serve to effectively optically and digitally filter the signal by continuously changing the position of the sub-pixels within a pixel such that they effectively wash away hard borders between pixel elements, or the pixels become effectively non-apparent. This can have the effect of reducing or minimizing distortions or artifacts in image related to Nyquist sampling by removing optical side bands in the displayed video which can reduce or eliminate aliasing, for example. The result can be substantially independent of pixel size and/or video frame rate as the frequency of the pattern is unrelated to those values. In some embodiments, the frequency of the pattern and the frequency of the spinning scanner can be configured to reduce or minimize the appearance of flicker in the displayed video. The result can be a digital projector that is capable of producing output video with a film-like quality but without the appearance of film grain. In some embodiments, the frequency of the repetition of the pattern by the refractive element 345 is between about 75 Hz and about 85 Hz, between about 40 Hz and about 120 Hz, or between about 30 Hz and about 250 Hz.

The sub-pixel generator 338 includes compensator motors 1001 and compensator wheels 1003. The compensator wheels can include quarter wave plates in them to adjust a polarization of the light passing through them. The compensator motors 1001 and wheels 1003, with their accompanying quarter wave plates, can be used to adjust the stereoscopic properties of the output video. This can be used to calibrate the projector 100 according to a theater, 3D glasses, and/or screen where the projector 100 is to be used. The sub-pixel generator 338 includes a hall sensor 1009 attached to the housing to provide feedback on the positions of the compensator wheels 1003. This can provide information to a user regarding the relative orientations of the fast and slow axes of the quarter wave plates mounted on the compensator wheels 1003.

The sub-pixel generator 338 includes two compensator motors 1001 and two compensator wheels 1003. In some embodiments, a greater number can be used, including three, four, or more than four. In some embodiments, there can be one compensator motor 1001 and one compensator wheel 1003. In some embodiments, the wobbler does not include a compensator motor 1001 or wheel 1003. The sub-pixel generator 338 includes various screws and attachment mechanisms 1010, 1011, and 1012 for respectively attaching the speaker plate 1006, the sensor board 1009, and the compensator motors 1001 to the housing 1005.

Example Projection Lens

Returning to FIG. 3, after leaving the microlens array 340 and the sub-pixel generator 345, the light enters the projection lens 350. The projection lens 350 can be configured to substantially focus a video or image created by an optical engine module 115 onto a screen 120. In some embodiments, the projection lens 350 is coated for broad spectrum light. In some embodiments, the lens 350 does not have a coating because the light source provides narrow band light rather than broad spectrum light.

Example Schematic Diagram of an Optical Engine Module

Figure 11A:
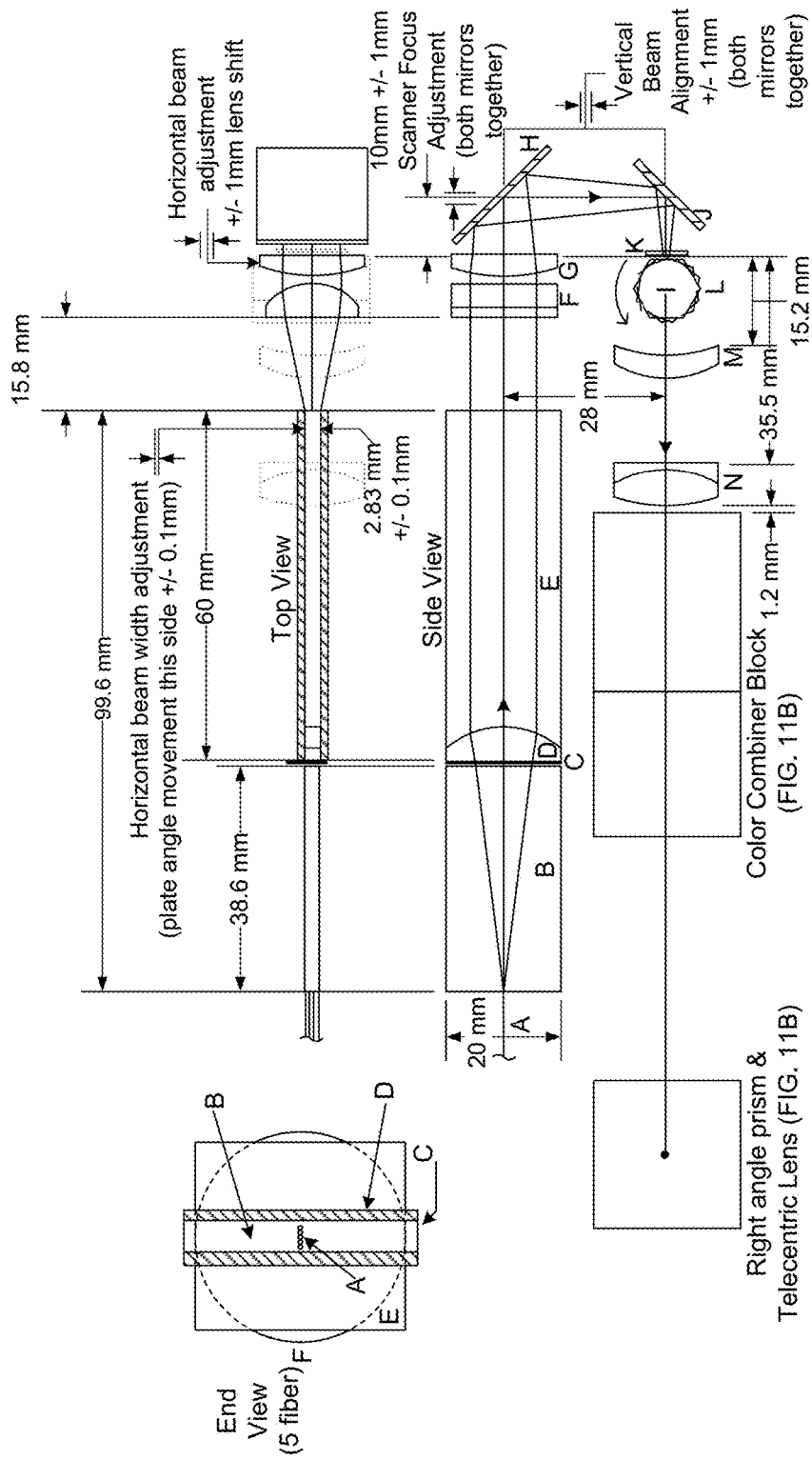
FIGS. 11A and 11B show schematic diagrams of some embodiments of a light engine module in a laser projector system.
Figure 11B:
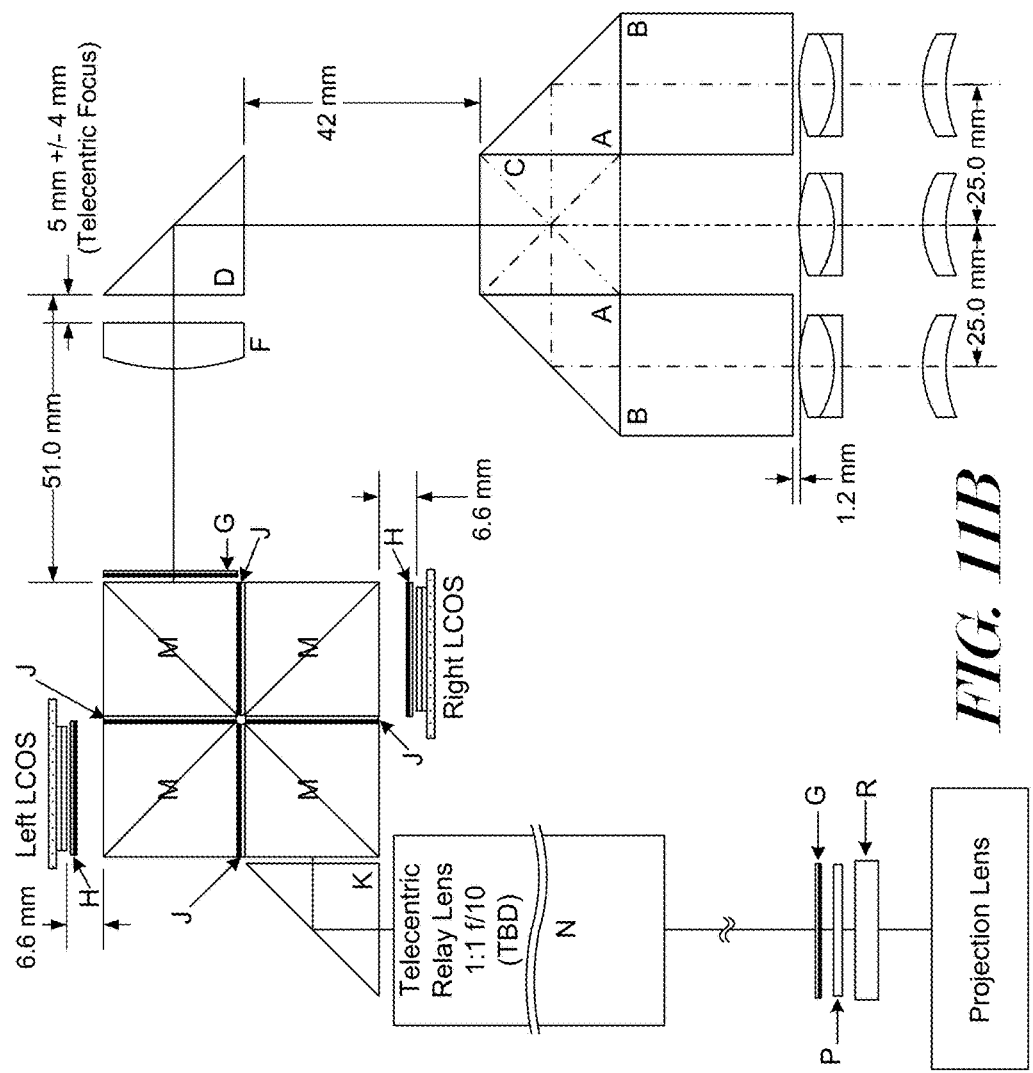

FIGS. 11A and 11B show schematic diagrams of some embodiments of an optical engine in a video projector system. FIG. 11A shows five optical fibers configured to transmit light from a light source to the optical engine module 115. In some embodiments, five fibers can be used to transmit a single color of light. In some embodiments using three colors of light, fifteen fibers can be used. Other numbers of fiber can be used to transmit light between a light source and the optical engine module 115. In some embodiments, a separate color cable for each color of light can be used, wherein each color cable comprises at least one fiber optics, at least two fiber optics, at least three fiber optics, at least four fiber optics, at least five fiber optics, or more than five fiber optics. In some embodiments, a first fiber optic in a color cable can be used to couple light of a first color from a first light engine module, a second fiber optic in the color cable can be used to couple light of the first color from a second light engine module, a third fiber optic in the color cable can be used to couple light of the first color from a third light engine module, and so on. In some embodiments, when one light engine module is used, the center fiber optic of each color cable can be used to efficiently illuminate the homogenizer B. In some embodiments, when two light engine modules are used, the fiber optics on either side of the central fiber optic can be used. In some embodiments, when three light engine modules are used, the outer fiber optics and the central fiber optic can be used to deliver light of a single color to the optical engine. The light from the optical fibers is transmitted into a first homogenizer B. After the first homogenizer B, the light passes through a lenticular lens array C and a plano-convex lens D into a second homogenizer E. The light leaving the second homogenizer E is then collimated using plano-convex cylindrical lens F which is subsequently focused by plano-convex lens G. The focused light reflects off mirrors H and J onto another lenticular lens array K. The light then encounters the hexagonal spinner L and transmitted through lenses M and N to the color combiner illustrated in FIG. 11B.

In FIG. 11B, the red, green, and blue lights are combined using a series of delay compensators B and prisms A such that they depart the color combiner C traveling along the same optical path (while being vertically separated due to the spinner L in FIG. 11A). The light passes through a telecentric focus comprising a prism D and plano-convex lens F. The light enters the polarizing and modulating element through a quarter wave plate G, and is divided depending on polarization into two paths. Both paths pass through a broadband polarizer M and a half wave polarization plate J before impinging on Left and Right LCoS panels H. The light leaves the LCoS panels and is combined at prism K to be passed to a telecentric relay lens N. The modulated and polarized light then passes through a quarter wave plate G before passing through a microlens array P and a window R. The polarized, modulated, and focused light then passes through the projection lens to be displayed. In some embodiments, the Left and Right LCoS panels are offset from one another to effectively double the number of output pixels of the light engine module.

Light Engine with LEDs

The video projector systems described herein can use laser light to provide illumination for the modulating panels. In some embodiments, LEDs can be used in addition to or instead of laser light. To provide sufficient luminosity, LEDs can be combined using the techniques described herein below to increase the output of the LEDs. By combining the LEDs, the output power can be increased and/or tuned to produce a satisfactory video output. LEDs can be a suitable alternative to lasers in some implementations based at least in part on their efficiency, compactness, large color gamut, long lifetime, low supply voltage, ability to switch on and off rapidly, etc. However, some LEDs provide lower optical power per unit source area and solid angle of emission (e.g., luminance) compared to lasers or other light sources. It may be desirable to combine the output of multiple LEDs to provide a light source with the advantageous properties of LEDs while providing sufficiently high luminance. Therefore, systems are provided that can be used to combine LED output for use in a projector system, such as a light engine module described herein.

Figure 12:
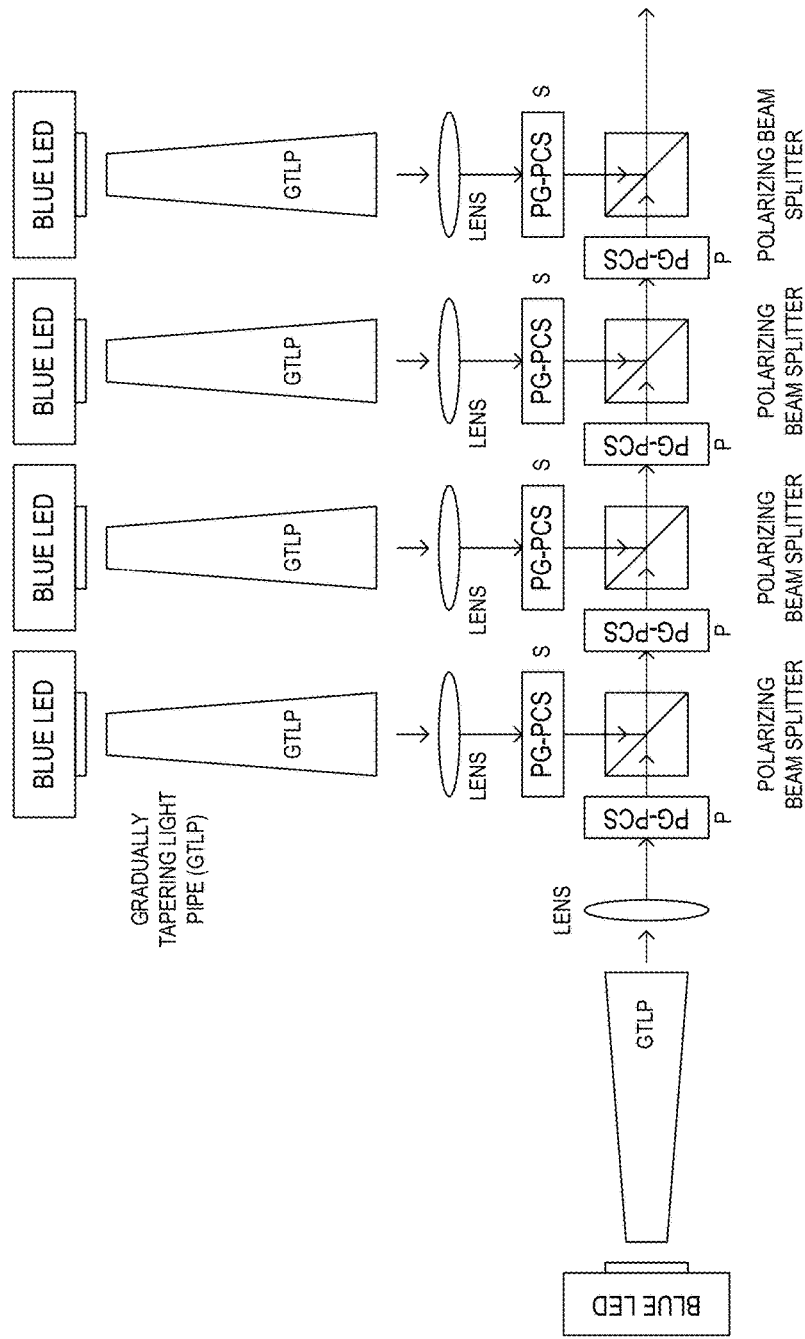
FIG. 12 illustrates a diagram of an example system for combining light from multiple LEDs of the same color to increase a power of a light engine.

FIG. 12 illustrates a diagram of an example system for combining light from two or more LEDs of the same color to increase a power of a light engine. By using the LED combining system, a monochromatic source of incoherent light can be provided. This can reduce speckle in the resulting video output compared to laser light sources due at least in part to using incoherent light sources. In addition, the LED combining system can be used to dynamically change a number of LEDs used to provide a particular color of light thereby changing the luminance of the light source.

As illustrated in FIG. 12, five blue LEDs are combined using a combination of gradually tapering light pipes (GTLPs), lenses, polarization grating-polarization conversion systems (PG-PCS) and polarizing beam splitters. Different numbers of LEDs can be used including, but not limited to, 2, 3, 4, 6, 7, 8, 9, 10, 20, 50, 100, etc. The LEDs used to create a monochromatic source of light can provide a range of colors within an accepted band of color. For example, blue LEDs can provide blue light with a wavelength that is within about 100 nm of an average or desired blue wavelength, within about 50 nm, within about 30 nm, within about 20 nm, or within about 10 nm. In addition, the LED combining system of FIG. 12 can be used with any color of LEDs including red, green, cyan, yellow, magenta, white, UV, etc.

The LED combining system of FIG. 12 can use GTLPs to collect, reshape, and/or uniformize the light flux from the LEDs to illuminate the optical components of the system in a substantially uniform manner. The LED combining system can also use lenses to focus or collimate the light exiting the GTLPs. The LED combining system can use PG-PCS components to efficiently polarize the LED light. PG-PCS optical components can be desirable to use because they can polarize approximately 90% of the light incident thereon, compared to traditional polarizing filters which may only polarize about 50% of the incident light with the rest being lost. In some implementations, instead of PG-PCS optical components any polarizing optical components can be used that efficiently polarize light by polarizing at least about 70% of the incident light, at least about 75% of the incident light, at least about 80% of the incident light, at least about 85% of the incident light, or at least about 90% of the incident light. By using the efficient polarization optical components, the efficiency of the LED light source system can be increased to levels that provide satisfactory results compared to other systems that use traditional polarization technologies. In some embodiments, a PG-PCS optical component can use a combination of micro-lens arrays, polarization gratings, louvered multi-twist retarders, and the like to efficiently polarize incident light. An example PG-PCS optical component is provided by ImagineOptix Corp. of North Carolina, USA and has a part number of E3 PGPCS.

The LED combining system of FIG. 12 can use polarizing beam splitters to combine the output from multiple LEDs after each has gone through at least one PG-PCS. The polarizing beam splitters can efficiently direct polarized light along a desired path, thereby combining the polarized light from the PG-PCS optical components. In this way, the light from multiple LEDs can be efficiently combined to provide a substantially monochromatic output.

Figure 13:
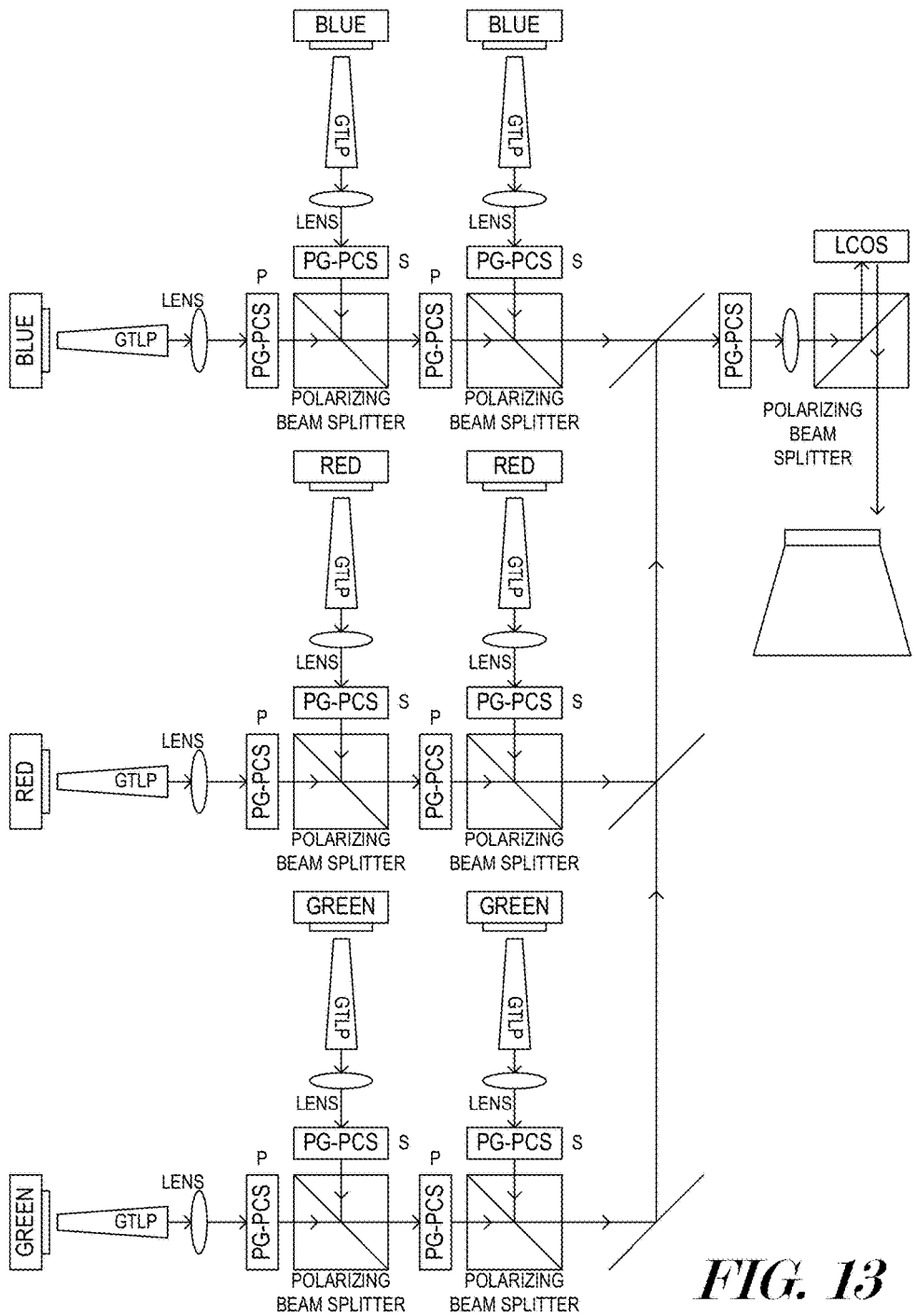
FIG. 13 illustrates a diagram of an example light engine employing the LED combining system of FIG. 12 for a plurality of colors of LED.

FIG. 13 illustrates a diagram of an example light engine employing the LED combining system of FIG. 12 for a plurality of colors of LED. For example, blue, red, and green LEDs can each be associated with their own LED combining system, such as the one described with reference to FIG. 12. The output of each of the LED combining systems can then be combined to provide polychromatic light output that can be used in a modulated projector system. As illustrated, the light engine module uses three LEDs for each of the three colors red, green, and blue. However, different numbers of LEDs can be used and each color can have a different number of LEDs. For example, a greater number of green LEDs can be used if it is desirable to enhance the green output of the projector or if the green LEDs provide less luminance than the other LEDs. In some embodiments, the light engine module can use more colors, such as adding yellow LEDs, white LEDs, etc.

The output of each of the LED combining systems can be combined using dichroic mirrors. The mirrors can be used to direct the combined LED output to another PG-PCS optical component to efficiently polarize the light incident on the modulating panel (e.g., the LCOS panel illustrated in FIG. 13). The modulated light can then be directed to a projector lens system for display.

Figure 14:
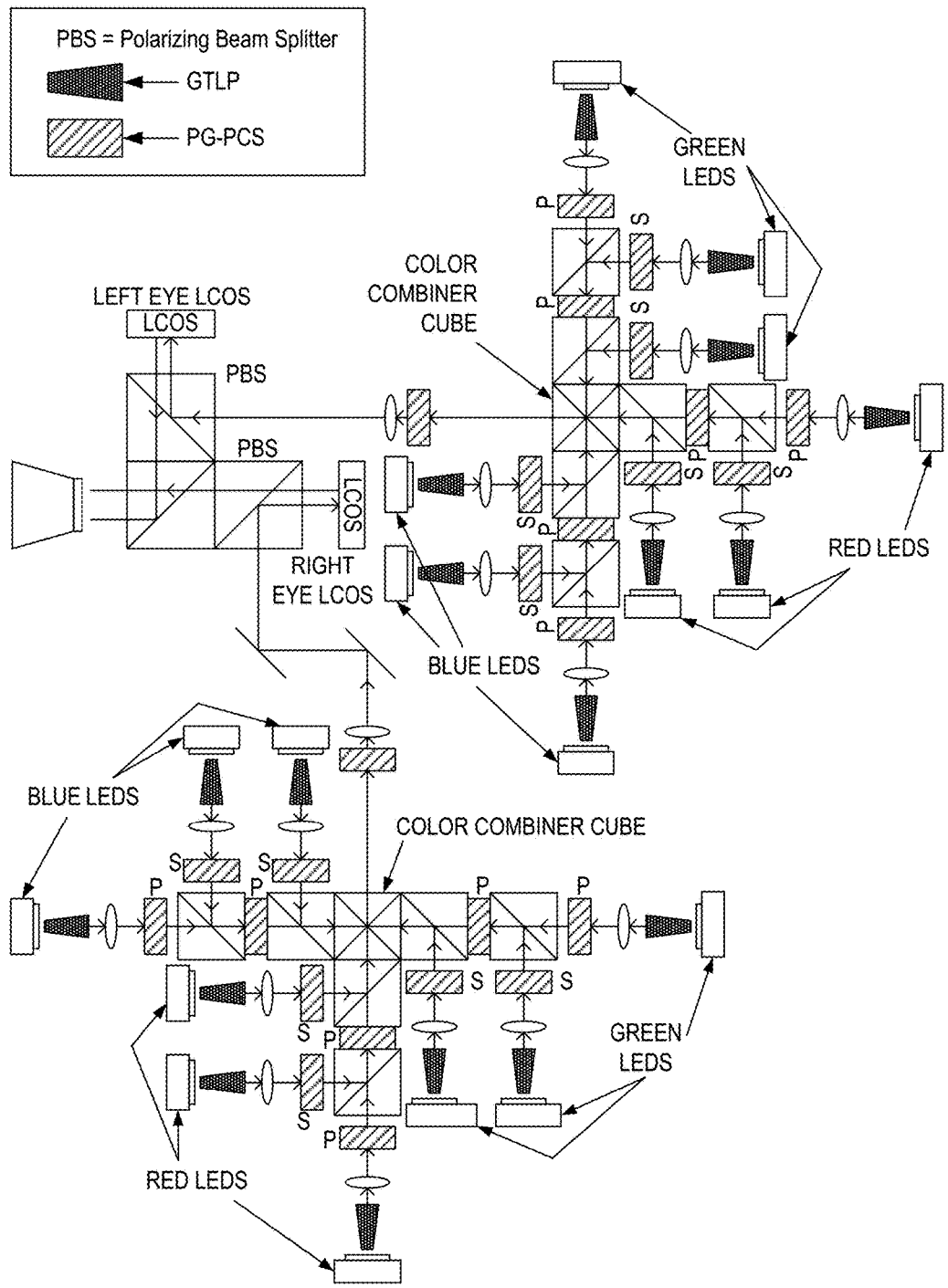
FIG. 14 illustrates a diagram of an example light engine producing stereoscopic output, the light engine employing a plurality of the LED combining systems of FIG. 12.

FIG. 14 illustrates a diagram of an example light engine producing stereoscopic output, the light engine employing a plurality of the LED combining systems of FIG. 12. In some embodiments, multiple light engine modules can be combined to provide stereoscopic output and/or LED combining systems can be configured to provide combined LED light having different polarizations to produce stereoscopic effects. The light engine module of FIG. 14 uses color combiner cubes to combine the output from the plurality of LED combining systems, each LED combining system being similar to the LED combining system illustrated in FIG. 12. The output from a "right" set of LEDs can be directed onto a "right eye" LCOS panel and the output from a "left" set of LEDs can be directed onto a "left eye" LCOS panel. The PG-PCS optical components can be used to configure the polarization for stereoscopic display and viewing. This configuration can reduce Fresnel loss through the use of the color combiner cube and polarizing beam splitters, thereby providing a relatively more efficient stereoscopic projector system.

Figure 15:
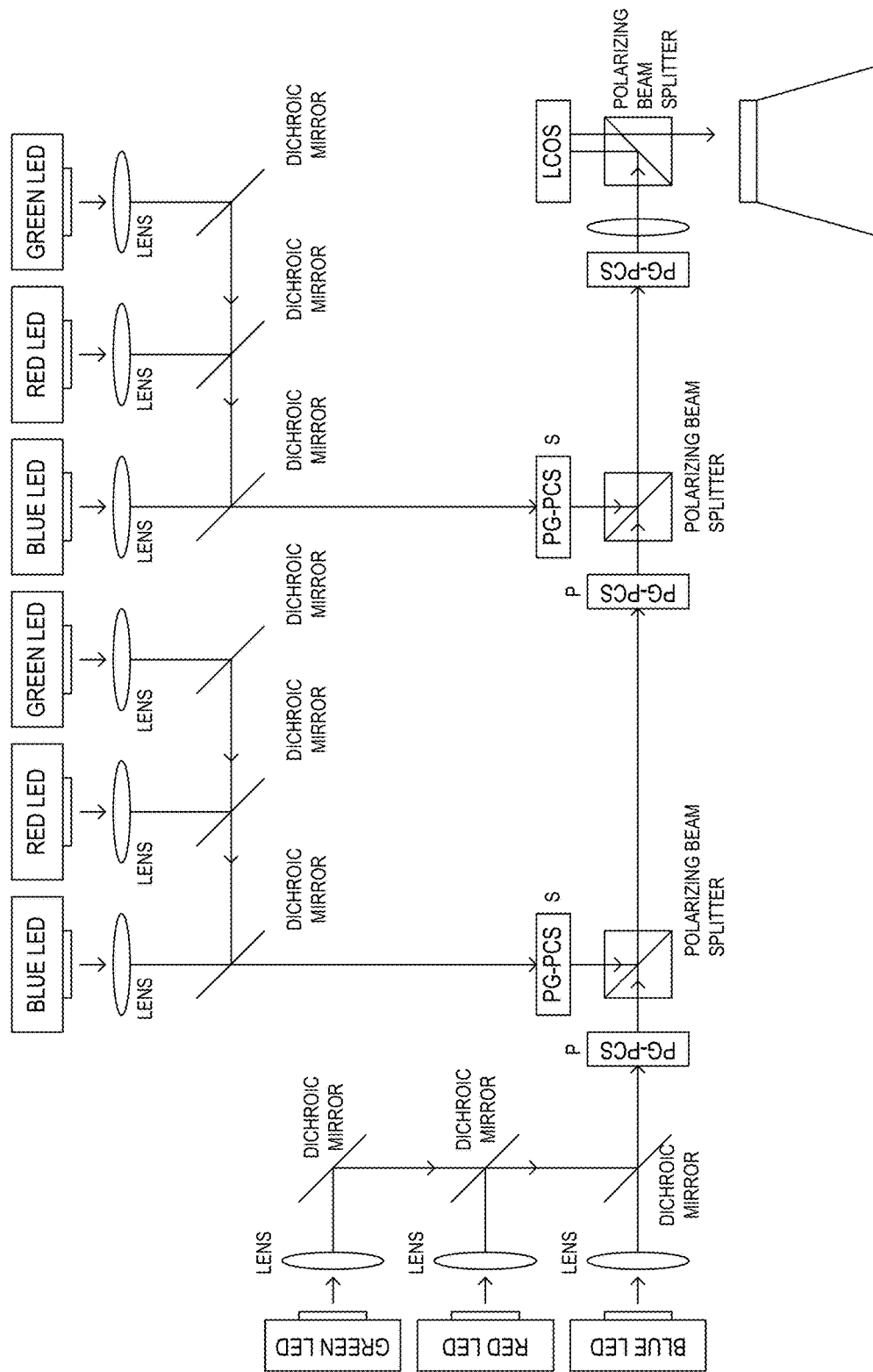
FIG. 15 illustrates a diagram of an example light engine comprising a plurality of LEDs combined onto an LCoS panel using dichroic mirrors, polarizing beam splitters, and polarization grating-polarization conversion systems.

FIG. 15 illustrates a diagram of an example light engine comprising a plurality of LEDs combined onto an LCoS panel using dichroic mirrors, polarizing beam splitters, and polarization grating-polarization conversion systems. In this example light engine module, light from LEDs having different colors is combined using dichroic mirrors prior to being combined using a combination of PG-PCS optical components and polarizing beam splitters. This can be advantageous where modular LED light modules are provided having a predetermined or selected color combination (e.g., red-green-blue, cyan-yellow-magenta, etc.) and it is desirable to increase luminance by increasing the number of LED modules used in the system.

Figure 16:
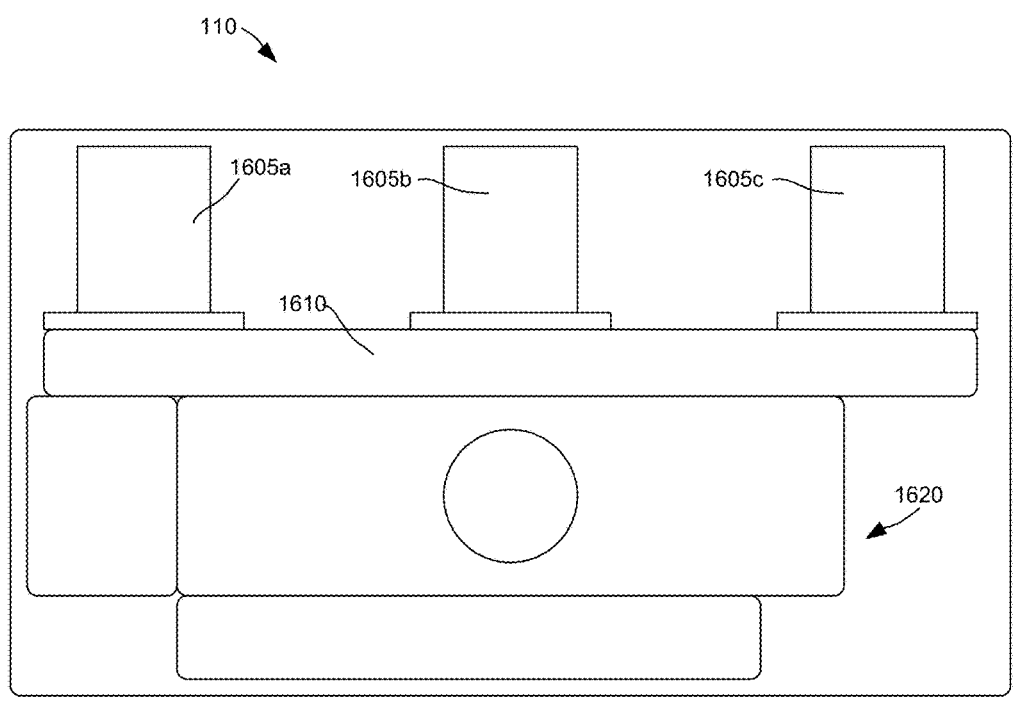
FIG. 16 shows an example light engine module for use with a video projector system.

FIG. 16 shows an example light engine 110 for use with a video projector system 100. The light engine 110 can include three light sources corresponding to a red light source 1605a, a green light source 1605b, and a blue light source 1605c. The light sources can be lasers, LEDs, laser diodes, etc. The output of the light sources can be coupled to fiber optic cables, one or more for each light source.

The light engine 110 includes a cooling plate 1610 thermally coupled to the light sources. Because the light sources are generating heat, the light engine 110 is configured to dissipate the heat and/or carry at least part of the heat away from the light sources 1605a, 1605b, 1605c. In some embodiments, the light engine 110 includes a cooling system 1620 that can include active and passive cooling elements. For example, the cooling system 1620 can include a compressor used to provide cooling in the light engine 110. The cooling system can include a radiator-type design and can include liquid passing through cooling elements. In some embodiments, a chiller can be used to provide cooling capabilities to the light engine 110.

Figures 17A, 17B:
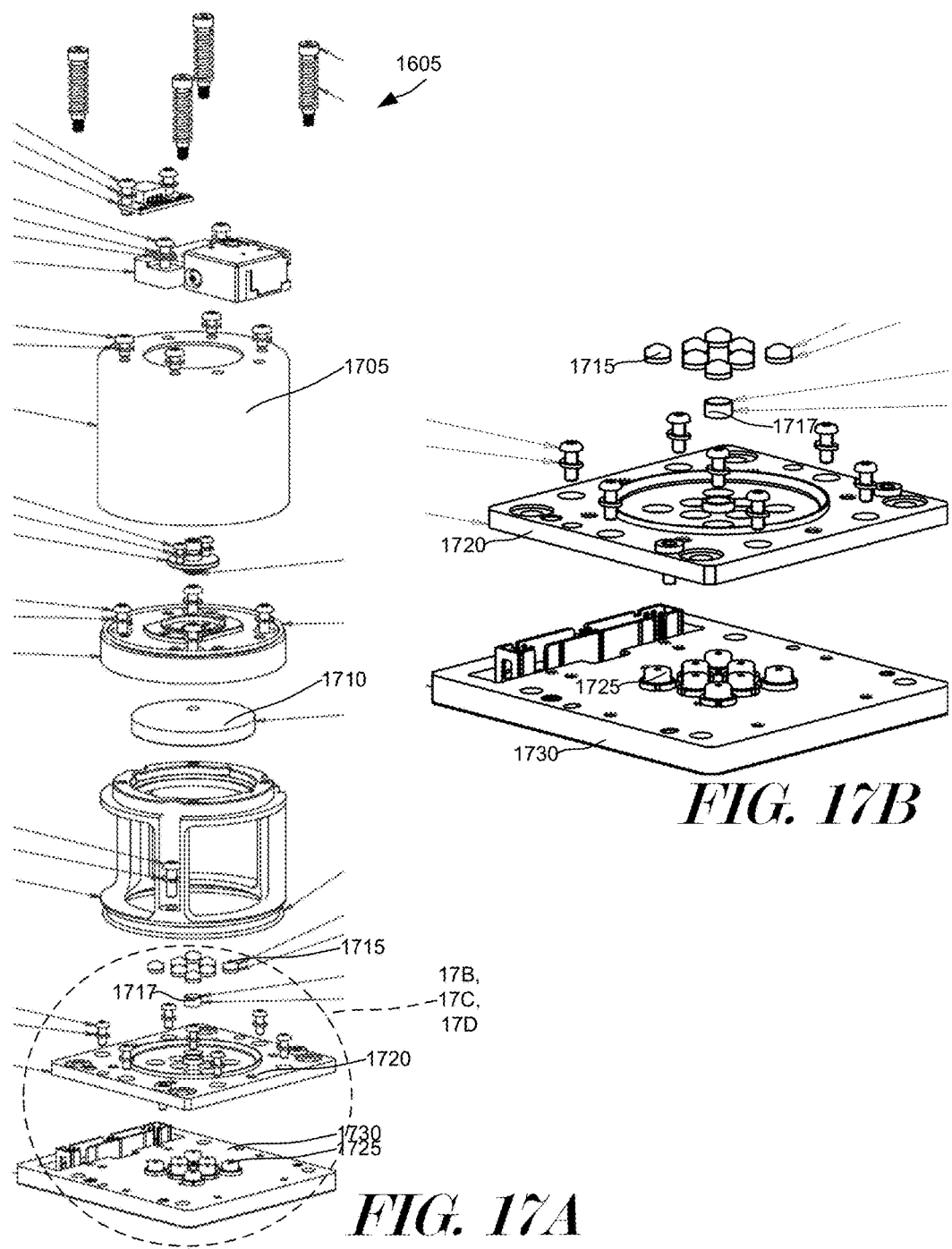
FIGS. 17A-D show example light sources each comprising a plurality of laser diodes.
Figure 17C:
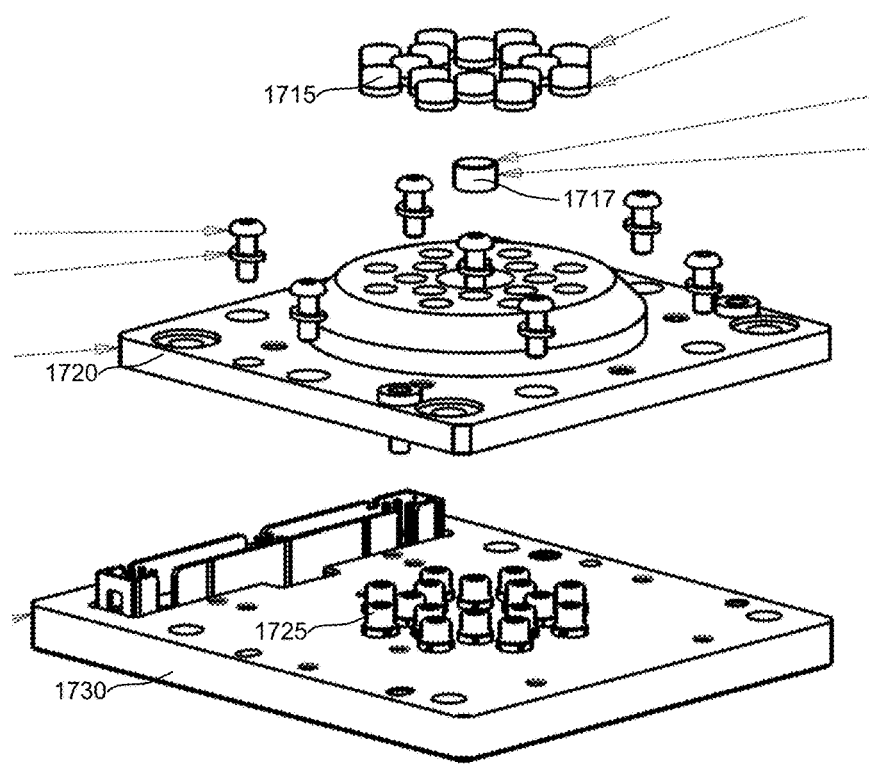
Figure 17D:
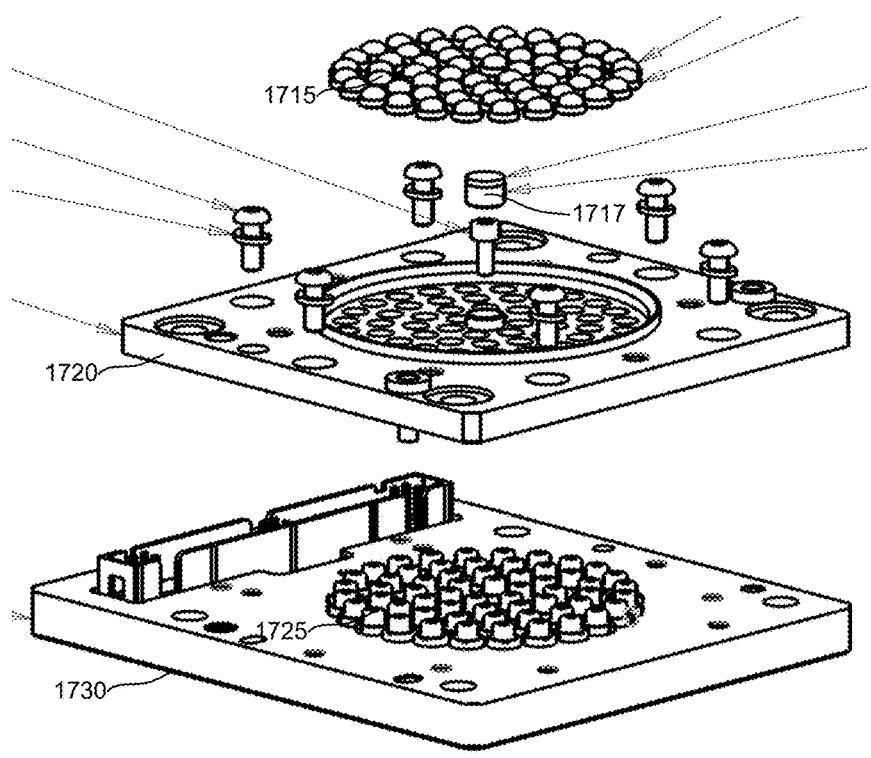

FIGS. 17A-D show example light sources 1605 each comprising a plurality of laser diodes. The light source 1605 can have a housing 1705 with multiple structural and optical elements configured to secure the laser diodes in the housing and to focus and direct the output light onto a fiber optic cable. The light source 1605 can have a mounting plate 1730 configured to support the laser diodes 1725 and to provide a heat sink. A lens plate 1720 can be positioned on the mounting plate 1730 to provide support for lenses 1715 that correspond to the laser diodes 1725. The lenses 1715 can be configured to direct the light output from each of the laser diodes 1725 to the reflective cap 1710 positioned in the housing 1705. The reflective cap 1710 can be configured to reflect and/or direct the output light from the laser diodes 1725 to a reflective element 1717 and then onto a fiber optic cable (not shown). In this way, the light output from the plurality of laser diodes 1725 can be collected and provided as a single light source. In some embodiments, the physical orientation of the various laser diodes 1725 can be arranged to reduce speckle due at least in part to polarization diversity (e.g., the output polarizations from the laser diodes can be configured to be non-uniform and/or randomized) and angular diversity (e.g., the light coming from the laser diodes travels different paths to the fiber optic cable, effectively coming from different angles). FIGS. 17B-17D illustrate a closer view of the mounting plate 1730, laser diodes 1725, lens plate 1720, and lenses 1715 of the light sources 1605. The number of laser diodes 1725 can be different for each light source 1605. In some embodiments, the number of green diodes can exceed the number of red laser diodes and/or blue laser diodes. For example, FIG. 17D can be an illustration of a green light source having a plurality of green laser diodes 1725.

FIGS. 18A-C show an example PCB board 1810 and heat sink 1815 used with the laser diode light sources 1605 illustrated in FIGS. 17A-D. The PCB board 1810 can be configured to provide electrical connections to a plurality of laser diodes. The PCB board 1810 can be configured to provide a thermally conductive connection to the heat sink while providing electrical connection to the PCB board 1810. The laser diodes can be controlled through signals sent through a connector 1825, which can distribute signals to the laser diodes through the PCB board 1810. The heat sink 1815 can be configured to provide mechanical support for the PCB board 1810 such that the PCB board 1810 can be seated within the heat sink 1815. The laser diodes can thus be electrically coupled to the PCB board 1810 and thermally coupled to the heat sink 1815. The heat sink 1815 can be configured to be large to dissipate heat generated by the laser diodes.

Figure 19:
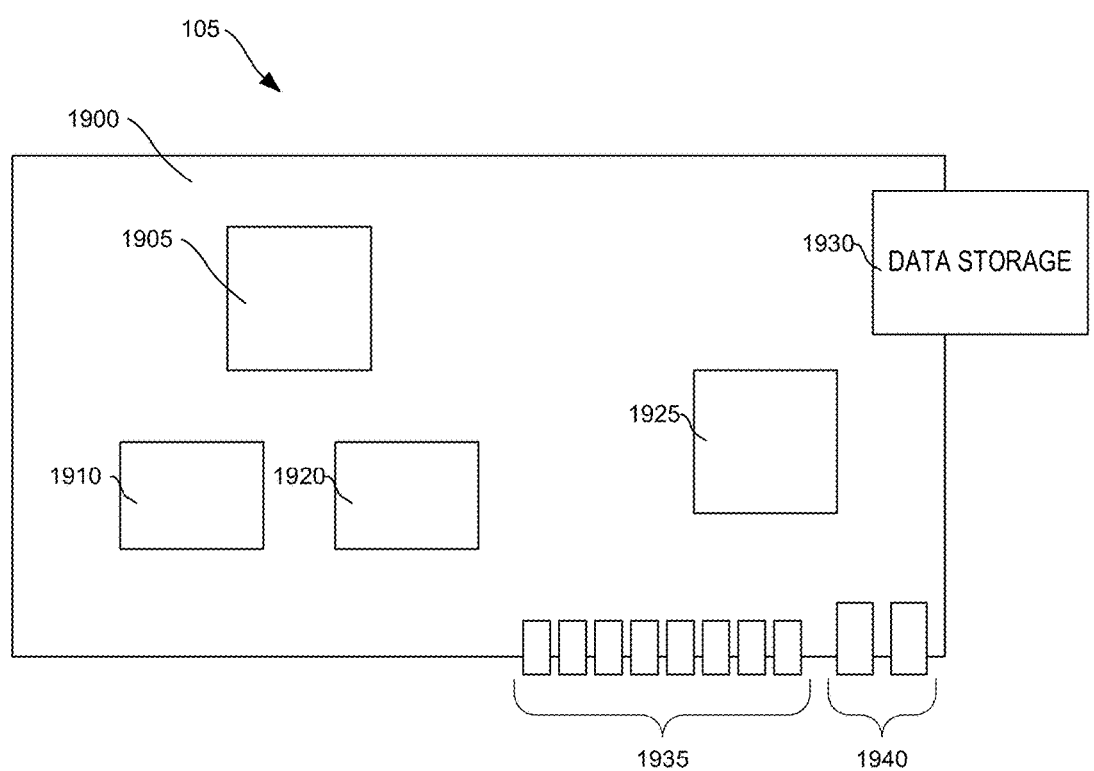
FIG. 19 illustrates an example electronics board for a video processor.

FIG. 19 illustrates an example electronics board 1900 for a video processor 105. The electronics board 1900 includes multiple inputs 1935 for receiving input from external systems. The inputs can be any suitable connector including, for example, HDMI, HD-SDI, DVI, and the like. The electronics board 1900 includes multiple outputs 1940 for delivering video data to an optical engine or projector head. The electronics board 1900 includes a video controller for encoding, decoding, encrypting, and/or decrypting input signals 1905. The electronics board 1900 includes one, two, or more video modules 1910, 1920 for generating video signals appropriate for delivery to the optical engine or projector head. The electronics board 1900 includes a packaging module 1925 for receiving the video signals from the video modules 1910, 1920 and producing an appropriate signal for deliver to the optical engines through the outputs 1940. The electronics board 1900 can include data storage 1930. Data storage 1930 can store video files that can be processed by the video modules 1910, 1920 and delivered to the projector head through the packaging module 1925 and outputs 1940.

Speckle Reduction

The video projector system described herein can include a number of elements and/or methods configured to reduce speckle when using coherent light sources. These elements and/or methods can be used in any combination in embodiments of the disclosed video projector system. Any subset of these speckle-reducing elements and/or methods can be implemented in embodiments of the disclosed video projector system. As described in greater detail herein, the video projector system can reduce speckle by increasing, for example, wavelength diversity, angle diversity, phase angle diversity, and/or polarization diversity. The video projector system can reduce speckle using any combination or subcombination of methods or components configured to increase one or more of wavelength diversity, angle diversity, phase angle diversity, or polarization diversity. The video projector system can reduce speckle using any combination of methods or components configured to decrease coherence through temporal averaging and/or spatial coherence destruction.

In some embodiments, speckle-reducing methods or components are independent of one another or can be independently implemented within a video projector system. For example, a microlens array can be placed in an optical path of an optical engine, increasing angular diversity, regardless of whether the light source includes other speckle-reducing characteristics, such as injecting RF-modulated signals into coherent light sources.

In some embodiments, a speckle-reducing method or component acts to reduce speckle in a variety of ways. For example, using a plurality of multimode fibers to deliver light to an optical path in an optical engine from a light source can serve to reduce speckle by increasing phase angle diversity, angular diversity, and polarization diversity, as described in greater detail herein.

The video projector system can increase wavelength diversity by increasing a spectral bandwidth of coherent light sources. The video projector system can increase wavelength diversity by providing coherent light sources with similar but different wavelengths. The video projector system can increase wavelength diversity by injecting RF-modulated signals into the coherent light sources to broaden the emitted spectrum. Any of these components or methods of increasing wavelength diversity can be used in any combination in the video projector system herein disclosed.

The video projector system can increase angle diversity through coupling of fiber optics between a light source engine and an optical path in an optical engine, as the light exiting physically separated fiber optic cables will enter an optical path with a variety of angles. The video projector system can increase angle diversity by varying an orientation of coherent light sources. The video projector system can increase angle diversity through optical modulators in an optical path of the optical engine. The video projector system can increase angle diversity through the use of optical elements such as multi-lens arrays (e.g., microlens arrays and/or lenticular lens arrays), diffusers, deformable mirrors, moving refractive elements, and/or integrators. The video projector system can increase angle diversity through the use of coatings on optical elements. Any of these components or methods of increasing angle diversity can be used in any combination in the video projector system herein disclosed.

The video projector system can increase phase angle diversity by using fiber optic cables to transport light from a light engine to an optical path of an optical engine, the phase angle diversity being increased by the multiple internal reflections of the light through the fiber optic. The video projector system can increase phase angle diversity by time-varying phase shift of a coherent light source through a suitable optical component. The video projector system can increase phase angle diversity by using multiple emitter sources in a light engine which are uncorrelated and/or non-coherently related. Any of these components or methods of increasing phase angle diversity can be used in any combination in the video projector system herein disclosed.

The video projector system can increase polarization diversity through orientation and/or mechanical rotation of emitter sources in a light engine. The video projector system can increase polarization diversity through the use of one or more fiber optic cables that is not configured to maintain polarization of light propagating through it (e.g., multimode fibers). Any of these components or methods of increasing polarization diversity can be used in any combination in the video projector system herein disclosed.

In some embodiments, the video projector system can reduce speckle by utilizing a light source with component sources of light that are incoherent relative to one another.

CONCLUSION

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps can be altered, added, removed, or rearranged. While certain embodiments have been explicitly described, other embodiments will become apparent to those of ordinary skill in the art based on this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. In some embodiments, the algorithms disclosed herein can be implemented as routines stored in a memory device. Additionally, a processor can be configured to execute the routines. In some embodiments, custom circuitry may be used.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A modular video projector system comprising:
   a plurality of light engine modules comprising at least one light source;
   an optical engine module housed in a separate packaging than the plurality of light engine modules; and
   a light guide configured to connect the plurality of light engine modules and the optical engine module and to transmit light from the plurality of light engine modules to the optical engine module;
   wherein the optical engine module is configured to:
     receive video data provided by video processing electronics;
     receive via the light guide light provided by the plurality of light engine modules;
     modulate the light provided by the plurality of light engine modules based on the video data provided by the video processing electronics; and
     project the modulated light.

2. The modular video projector system of claim 1, wherein the light engine modules provide laser light.

3. The modular video projector system of claim 1, wherein the light source comprises a plurality of lasers.

4. The modular video projector system of claim 1, further comprising a video processing module containing the video processing electronics.

5. The modular video projector system of claim 1 wherein the light guide comprises a cable.

6. The modular video projector system of claim 5 wherein the light guide is greater than or equal to 1 meter long.

7. The modular video projector system of claim 6 wherein the light guide is less than or equal to 100 meters long.

8. The modular video projector system of claim 5 wherein the light guide is greater than or equal to about 3 meters long.

9. The modular video projector system of claim 1 wherein the optical engine module is further configured to reduce a size of received pixels and move reduced size pixels within a bounded output pixel to at least 2 locations.

10. The modular video projector system of claim 1 wherein the light provided by the light engine modules comprises at least three colors, and wherein the optical engine module is configured to scan a separate band for each of the three colors across a surface of at least one modulating element.

11. The modular video projector system of claim 10 wherein a gap of substantially no light exists between the bands.

12. The modular video projector system of claim 10 wherein the optical engine includes spinning refractive elements which perform the scanning.

13. The modular video projector system of claim 1, wherein the light engine module is configured to provide at least two colors of light, and wherein the light engine module further comprises, for each of the at least two colors of light:
   two or more light emitting diodes providing an input color of light;
   a polarization conversion system for each of the two or more light emitting diodes, the polarization conversion system configured to receive light from at least one of the two or more light emitting diodes and output polarized light; and
   a polarizing beam splitter configured to receive the output polarized light from each polarization conversion system and output combined light corresponding to the input color of light,
   wherein at least about 70% of the light received by each polarization conversion system is output as polarized light.

14. A light engine module for use in a modular video projector system, the light engine module comprising:
   a light engine housing;
   one or more light sources housed within the light engine housing;
   an optical output configured to connect with a fiber optic cable; and
   an optical system configured to direct the light provided by the one or more light sources onto the optical output;
   wherein incorporation of the light engine module into a modular video projector system allows the light produced by the light engine module and output via the optical output to be combinable with light produced by one or more other light engine modules also incorporated into the modular video projector system to provide a scalable light source.

15. The light engine module of claim 14, wherein the light engine housing is configured to be mounted within a rack.

16. The light engine module of claim 14, wherein the one or more light sources comprises a first, a second, and a third light source configured to produce red, green, and blue light, respectively, each having a red, green, and blue central wavelength and spectral bandwidth, respectively.

17. The light engine module of claim 14, wherein the light sources comprise at least one of laser light source, laser diodes, and light emitting diodes (LEDs).

18. A modular video projector system comprising a projector head and a plurality of the light engine modules of claim 17 that, in use, provide light to the projector head.

* * * * *